(12) United States Patent  
Gould et al.

(10) Patent No.: US 10,552,125 B1  
(45) Date of Patent: Feb. 4, 2020

(54) MESSAGING BETWEEN COMPONENTS IN GRAPHICAL USER INTERFACES FOR INDUSTRIAL CONTROL SYSTEMS

(71) Applicant: Inductive Automation, LLC, Folsom, CA (US)

(72) Inventors: Carl Reuben Gould, Folsom, CA (US); Perry Linn Arellano-Jones, Sacramento, CA (US)

(73) Assignee: Inductive Automation, LLC, Folsom, CA (US)

( * ) Notice: Subject to any disclaimer, the term of this patent is extended or adjusted under 35 U.S.C. 154(b) by 0 days.

(21) Appl. No.: 16/353,814

(22) Filed: Mar. 14, 2019

Related U.S. Application Data

(60) Provisional application No. 62/732,998, filed on Sep. 18, 2018.

(51) Int. Cl.
  *G06F 8/34* (2018.01)
  *G06F 8/77* (2018.01)
  *G06Q 10/10* (2012.01)

(52) U.S. Cl.
  CPC ............ *G06F 8/34* (2013.01); *G06F 8/77* (2013.01); *G06Q 10/103* (2013.01)

(58) Field of Classification Search
  None
  See application file for complete search history.

(56) References Cited

U.S. PATENT DOCUMENTS

| | | | | |
|---|---|---|---|---|
| 2004/0001089 A1* | 1/2004 | Becker | ............... | G06Q 10/107 715/749 |
| 2004/0133848 A1* | 7/2004 | Hunt | ............... | G06F 16/9577 715/273 |
| 2013/0006395 A1* | 1/2013 | Plache | ............... | G05B 19/0426 700/83 |
| 2015/0020080 A1* | 1/2015 | Simsek | ............... | G06F 9/546 719/314 |
| 2016/0154774 A1* | 6/2016 | Kolam | ............... | H04L 29/08072 715/234 |
| 2016/0291959 A1 | 10/2016 | Searle et al. | | |
| 2016/0294605 A1 | 10/2016 | Searle et al. | | |
| 2019/0132276 A1* | 5/2019 | Scheiber | ............... | H04L 51/36 |

OTHER PUBLICATIONS

United States Office Action, U.S. Appl. No. 16/425,816, dated Aug. 28, 2019, 25 pages.

\* cited by examiner

*Primary Examiner* — Daxin Wu
(74) *Attorney, Agent, or Firm* — Fenwick & West LLP

(57) ABSTRACT

A method for delivering a message between components in a project using a GUI through which users may be able to monitor and control industrial processes. Each component has graphical features and/or behavioral features. The method comprises steps of: receiving first definition input to define a message handler associated with a first component in the project for receiving messages for the first component and receiving second definition input to define a messenger associated with a second component in the project for sending messages. The method includes, in response to receiving a payload input via the messenger associated with the second component: identifying components having associated message handlers with a message type definition that matches a message type argument of the messenger and a scope definition that matches a scope argument of the messenger, delivering the payload, and executing script implementations of the message handlers.

18 Claims, 15 Drawing Sheets

MESSAGING BETWEEN COMPONENTS IN GRAPHICAL USER INTERFACES FOR INDUSTRIAL CONTROL SYSTEMS

CROSS-REFERENCE TO RELATED APPLICATIONS

This application claims the benefit of and priority to U.S. Provisional Application No. 62/732,998, filed Sep. 18, 2018, the contents of which are incorporated herein by reference in its entirety for all purposes.

BACKGROUND

Field of Art

This disclosure relates generally to delivering messages between components in a session of a project for monitoring and controlling industrial processes using graphical elements presented on an electronic display, e.g., via a graphical user interface (GUI).

Description of Art

Industrial processes can produce a great deal of useful and important data related to the states and conditions of associated machines and other data production sources. For example, it is advantageous for a manager of a factory to be able to monitor the state of a pump, oven, or pipeline remotely without the need to inspect the entity in person. Real-time remote monitoring of industrial processes becomes especially important at scale. For example, it is infeasible for a manager in charge of multiple factories, each having hundreds of motors to inspect every motor in person.

Software that allows users to view information about different components related to an industrial process can thus be useful. However, it can be likewise time consuming and occasionally infeasible for designers of user interfaces to configure the interfaces such that they can show useful, relevant, and current information if the designers need to develop applications from scratch that represent the particular components of any one industrial process, especially when the same designers need to hard code, as well as update, information about individual machines. This problem is exacerbated when a designer needs to understand software development to be able to make a useful user interface.

SUMMARY

A system provides an interface for designing and implementing graphical user interfaces projects that users can access through web browsers. Depending on the user interface configuration, users can monitor and control many components of industrial processes from clients such as any computer device supporting a web browser such as smartphones, tablets, desktop computers, laptop computer, and the like. The design interface includes functionality for utilizing preprogrammed components, or for generating new components for display or function. The design interface further allows designers to associate data values received from a variety of sources with properties of the components in the user interfaces. In particular, properties associated with a component of an interface are stored in property tree structures, making dynamic changes to the components possible. Delivering messages between components distributed throughout the project is accomplished by defining message handlers for some components configured to listen for messages at a given scope of the project, defining the messenger associated with another component in the project, and distributing the message to the appropriate message handlers in the project.

In one embodiment of a project comprising components arranged in a hierarchical structure and displayed in a web browser, each component having one or more graphical features or one or more behavioral features of the component when displayed in the web browser, a method comprises steps of: receiving first definition input to define a message handler associated with a first component in the project for receiving messages for the first component, the definition input comprising: a message type definition for the message handler identifying the message the message handler reads, a scope definition for the message handler indicating one or more levels in the hierarchical structure of the project at which the message handler receives messages, a script implementation describing a response by the message handler to receiving messages; receiving second definition input to define a messenger associated with a second component in the project for sending messages, the message input comprising: a message type argument, a scope argument indicating a level of the project at which to deliver the message, and a payload option; and wherein, in response to receiving a payload input via the messenger associated with the second component from a session of the project: identifying one or more components having associated message handlers with a message type definition that matches the message type argument and a scope definition that matches the scope argument, and delivering the payload as an argument to the identified one or more components with the matching message handlers, and executing the script implementations of the message handlers.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Gateway System Environment

Figure 1:
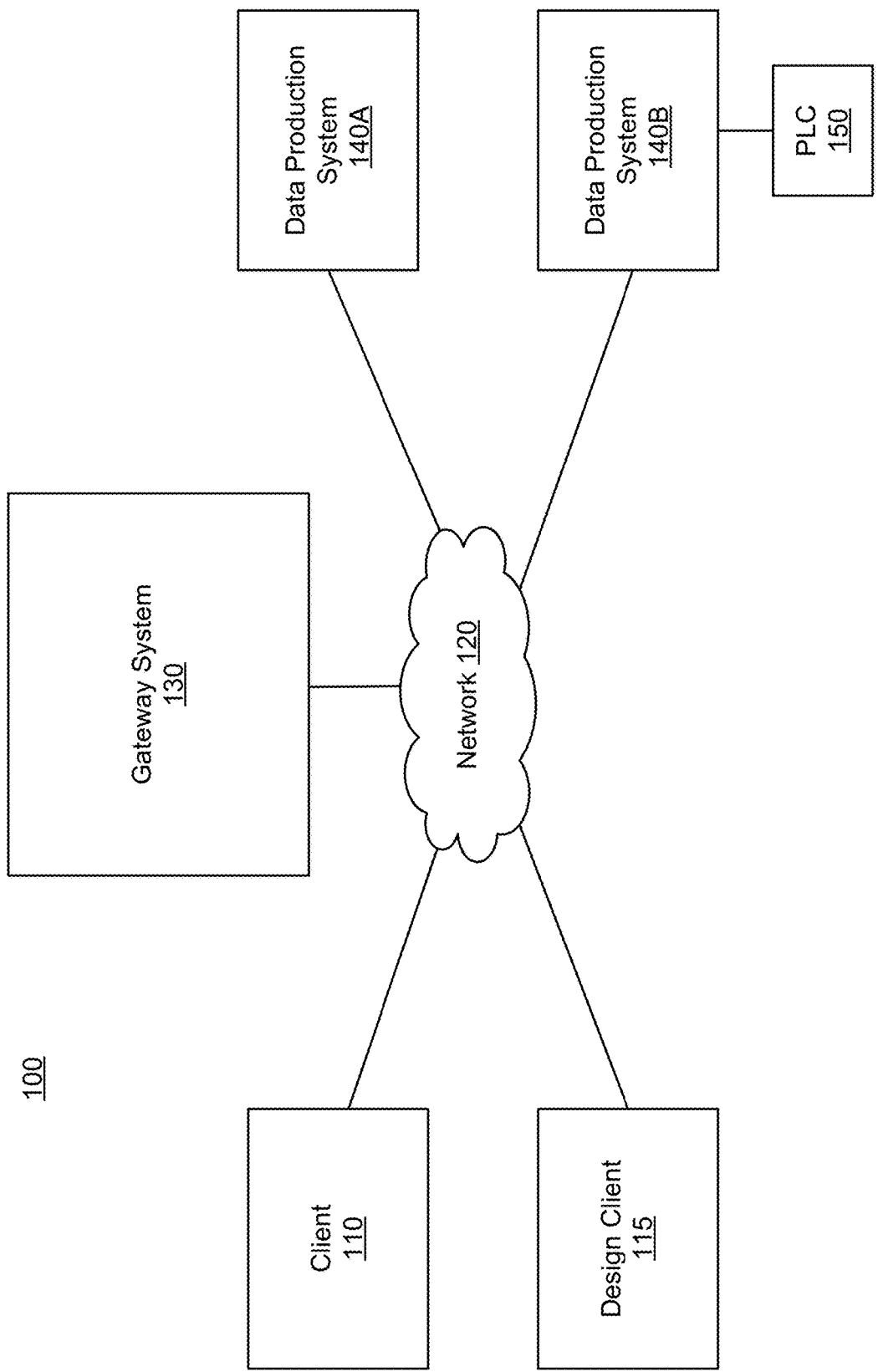
FIG. 1 is a high-level block diagram of a system environment for a gateway system, in accordance with some embodiments.

Figure (FIG. 1 is a high-level block diagram of a system environment 100 for a gateway system 130, in accordance with some embodiments. The system environment 100 shown in FIG. 1 includes the gateway system 130, a client 110, a design client 115, a network 120, a data production system 140A, a data production system 140B, and a programmable logic controller (PLC) 150. For clarity, only one client 110, one design client 115, and two data production systems 140 are shown in FIG. 1. Alternate embodiments of the system environment 100 can have any number of clients 110 and design clients 115, as well as more or fewer data production systems 140. As one example of an alternate embodiment, any combination of a client 110, a design client 115, and the gateway system 130 may all be a part of one computing machine without interacting over a network 120. The functions performed by the various entities of FIG. 1 may also vary in different embodiments.

The gateway system 130 coordinates the synchronization and display of data on clients 110. That is, the gateway system 130 acts as a backend to support information displayed to users at the client 110 which represents a frontend. The gateway system 130 stores and provides information about user interfaces for applications such as web applications. The web applications may, for example, be web applications for monitoring and interacting with local or remote industrial systems and processes.

User interfaces for the applications may be generated by a designer through a design client 115 and may include views of components. User interfaces may include graphical user interfaces that use one or more graphical elements for interfacing with one or more users. The gateway system 130 stores information about such interfaces for display at clients 110 and manages and routes underlying data that may cause changes to the display of the interface at a client 110. A component is a graphical element in a view and information about the component is stored in the gateway system 130 as a "component data model." Some examples of components include user interaction components, such as sliders, buttons, text fields, and drop down menus; this list is non-exhaustive. Examples of components may further include visual representations of machines or data related to industrial processes such as visual representations of pumps, gauges, dials, levers, motors, conveyor belts, tanks, ovens, graphs, and so forth.

The gateway system 130 acts as an intermediary between the actual industrial processes and information about such processes that is displayed at a client 110. In particular, the gateway system 130 makes it possible to establish uni-directional and bi-directional data bindings such that data coming from a data source, such as a data production system 140 is reflected in information displayed at a client 110. If bi-directional, adjustments made to the industrial process through a component of a GUI at a client 110 also can make changes to the industrial process occurring at the data production system 140.

A user may view and interact with a GUI through a client 110. Clients 110 can be personal or mobile computing devices such as smartphones, tablets, or notebook computers, desktop computers, or other forms of computing devices. In some embodiments, the client 110 accesses GUIs provided by the gateway system 130 via a browser application running on the client 110 that accesses information on the gateway system 130 over the network 120. In some embodiments, the client 110 executes a client application that uses an application programming interface (API) to access GUIs provided by the gateway system 130 through the network 120.

As one example, a user may access a project for an industrial process by navigating to the GUI using a browser to interact with the gateway system 130. For example, a manager at an industrial bakery may want to know the temperature of a set of ovens in the bakery. The manager could access a GUI designed to display components representing the ovens and their current temperatures by navigating to the GUI, hosted by the gateway system 130, which is associated with oven temperatures via a browser on the client 110.

The design client 115 is a type of client 110 that is configured to allow a user to design the GUIs that may be accessed via other clients 110. In one embodiment, all clients may also be design clients 115, and design clients 115 may allow a user to do everything a user can do via a client 110, such as viewing and interacting with the GUI. The design client 115 may display a design GUI provided by the gateway system 130 that allows a designer to organize and configure components of a GUI for representing a system, industrial process, or the like. In addition to allowing a designer to define a layout of components for a GUI, the design GUI may include functionality for a designer to establish data bindings between data values originating from various data sources at a data production system 140 and component properties associated with a component in the GUI. For example, a GUI for monitoring oven temperatures in an industrial bakery may include components representing temperature gauges for each oven, configured such that a change in an oven's temperature affects the display of the gauge in the GUI, when viewed at a client. A designer may also use the design GUI to assign values to visual aspects of the components in the GUI, for example, by including labels, designating colors, and the like.

A data production system 140 may be any system that acts as a data source for the gateway system 130. That is, a data production system 140 provides data values to the gateway system 130. Examples of data production systems 140 include open platform communications (OPC) servers, programmable logic controllers (PLCs), web servers supporting representational state transform application programming interfaces (RESTful APIs), databases, or other systems that can provide data values. In some cases, the gateway system 130 may act as a data production system 140 with respect to itself, for example, when a component property is defined in association with properties of another component. In some embodiments, the gateway system 130 may act as a data production system 140 when hosting user-defined data values (sometimes also referred to as "user defined types" or "user defined tags"). For example, a designer may store a data value or information for generating a data value (e.g., a script) at the gateway system 130. A GUI displayed at a client 110 may incorporate information received from various combinations of different data production systems 140.

In the example of FIG. 1, data production system 140B may be an example of an OPC server providing an interface between the gateway system 130 and data values produced by a PLC 150. In some embodiments, a PLC 150 stores values referred to as "PLC tags" in a tag database within the memory of the PLC 150. A PLC tag is generally a named variable that can be assigned a type of data and stored in the memory of a PLC 150. Throughout this document, the term "PLC tag" may also be used to refer to the data values output from a PLC 150, which may be received by the gateway system 130 in the form of named variables, or as unnamed data values. In one embodiment, the gateway system 130 represents data values (e.g., including PLC tag values received from PLCs) as data values, as may be stored in a source data store 230 on the gateway system 130.

As an example, the PLC 150 may be coupled to an oven for monitoring and control of oven parameters. The PLC tag values generated by the PLC 150 may be tuples of data values including a scalar value, a quality value, and a timestamp value. For example, a PLC 150 may be coupled to an oven in an industrial bakery, and may be configured to monitor and control the oven temperature and the oven humidity. The PLC 150 may provide data related to the oven temperature and the oven humidity to the gateway system 130 via the data production system 140B. In one example the tuple of data values may include a scalar value for the temperature of the oven, a quality value of the scalar value retrieved from the PLC 150, and a timestamp value corresponding to the determined scalar value. Changes to the oven temperature and humidity may be displayed via the GUI at clients 110 and at the design client 115. In some embodiments, the data production system 140 can also receive data from the gateway system 130 and update associated systems and processes accordingly. For example, a manager at the industrial bakery may adjust target values for the temperature of an oven via components of the GUI at a client 110. The changed value related to oven temperature may be sent by the gateway system 130 to the data production system 140, which can adjust the actual temperature of the oven via the PLC 150.

Clients 110, design clients 115, and data production systems 140 can communicate with the gateway system 130 via the network 120, which may comprise any combination of local area and wide area networks employing wired or wireless communication links. In some embodiments, all or some of the communication on the network 120 may be encrypted.

Gateway System Architecture

Figure 2:
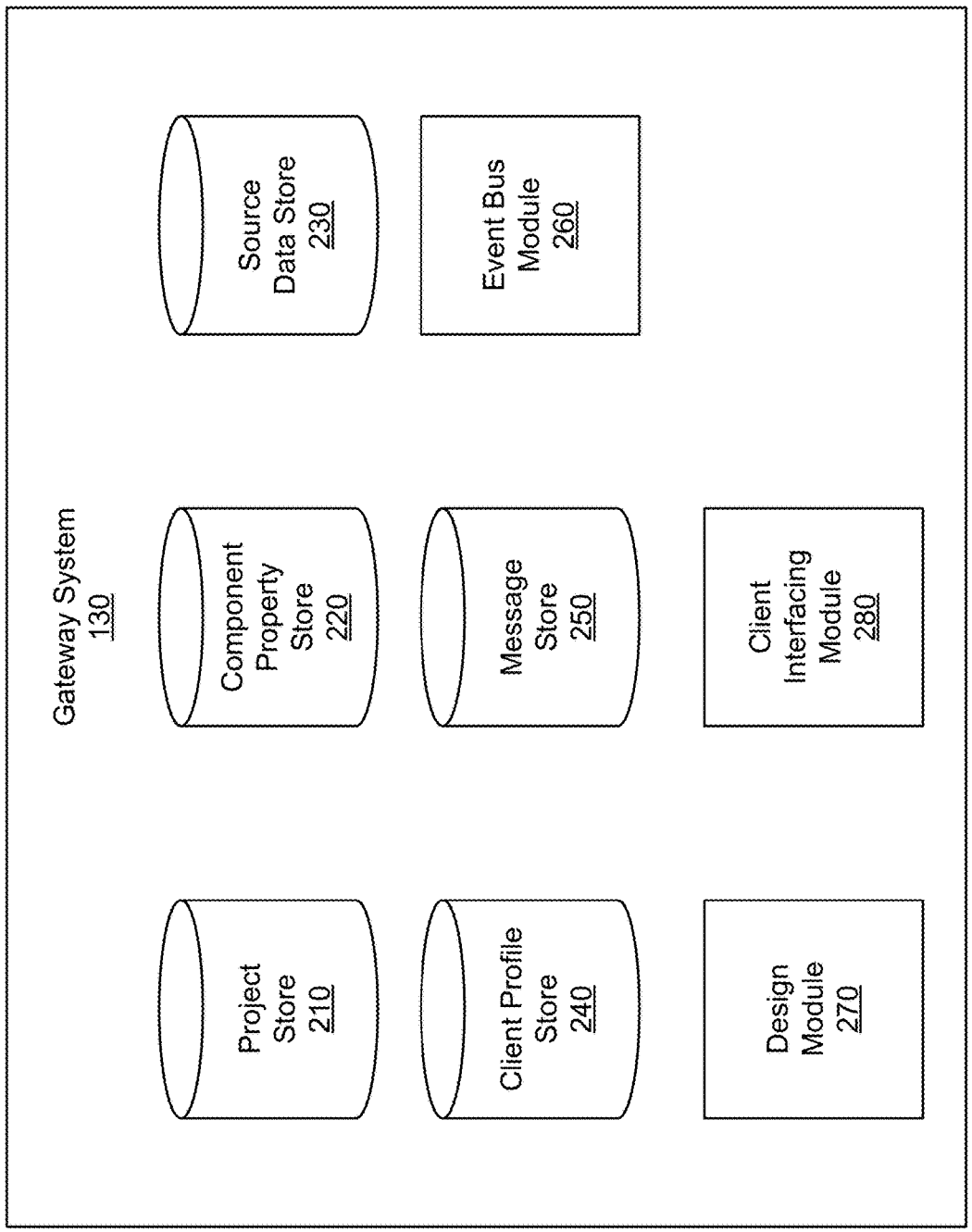
FIG. 2 is a high-level block diagram of a gateway system architecture, in accordance with some embodiments.

FIG. 2 is a high-level block diagram of a gateway system 130 architecture, in accordance with some embodiments. In some embodiments, the gateway system 130 includes a project store 210, a component property store 220, a source data store 230, a client profile store 240, a message store 250, an event bus module 260, a design module 270, and a client interfacing module 280. Conventional modules such as web servers, network interfaces, security functions, load balancers, failover servers, management and network operations consoles, and the like are not shown so as to not obscure the details of the system architecture; however, embodiments may include such conventional modules. Additionally, the gateway system 130 may include more, fewer, or different modules and data stores than those shown in FIG. 2, and the functions can be distributed among the modules and data stores in a different manner than is shown in FIG. 2.

The project store 210 stores projects that are executable by the gateway system 130. Each project is a human-machine interface (HMI) executed by the gateway system 130 that provides GUIs to one or more clients 110 or 115 for monitoring or controlling systems, such as industrial processes and for interfacing with one or more data production systems 140, such as machines in an industrial system. The project is created and defined by one or more design clients 115 via the design module 270. The one or more design clients 115 communicate with the gateway system 130 to generate and modify the project. Each project presents graphical information via a GUI through a gateway session provided by the gateway system 130 and executed on a client 110. Each project can have project properties that include additional information on that project, e.g., a name of the project, a sub-title, a project description, a date and/or time stamp of project creation or last modification, etc. The project store 210 may store all projects and can provide information about each project to other modules of the gateway system 130.

Each project has a project hierarchy comprising various levels. When a client 110 or client 115 accesses a project, the gateway system 130 generates a gateway session for the client 110 or 115 to access the project. The project hierarchy, at one level, has one or more views with each view containing information or data presentable to one or more clients 110 via a GUI. Views are graphical portions of the GUI that can display graphical information. Each view, at another level of the project hierarchy, contains one or more components. Components are the graphical elements displayed in the view when a gateway session of a project is executed on a client 110, e.g., via a web browser or via an API. Each view has view properties that dictate presentation of the view in the GUI. In some embodiments, each view has view properties that may be categorized into general view properties, parameter view properties, and custom view properties. General view properties may be properties that are present amongst all views and can be toggled to adjust display of the view (e.g., width of the view in the GUI, length of the view, background color of the view, foreground color of the view, name of the view, sub-title of the view, font, etc.). Parameter view properties include parameters that transfer data to and/or from the project to the view. In some embodiments, an input view parameter property receives data external to the page and an output parameter view property transmits data out of the page to the project. In other embodiments, a parameter view property may combine functionality of the input parameter view property and the output parameter view property. Custom view properties may be user-defined and specific to each view.

In additional embodiments, pages and containers may also be used in tandem with the views to organize the views within each project. Pages and containers may, respectively, be organized at other levels of the project hierarchy. In some embodiments, a page collates one or more views and has associated page properties similar to the view properties defined above for views—such as the general page properties, parameter page properties, and custom page properties. In these embodiments, a page is presented in the GUI such that the one or more views are displayed to be contained within the page. In further embodiments, a container further subdivides a view and may have its own components and its own various container properties similar to the view properties defined above for views. Pages and containers may be at varying levels of the project hierarchy. In one example, a project has a first level with one or more pages, a second level wherein each page has one or more views, a third level wherein each view has one or more components and/or one or more containers potentially having more components. In another example, a first level is a session level, a second level is a pages level, and a third level is a views level. The use of "first" "second," and "third" levels herein is meant to enumerate and distinguish the levels for the sake of description. Thus, the pages and containers described as being in a particular (e.g., "first") level do are not limited to existing only within that enumerated level.

Components are graphical elements that are placed and configured within a view of a project to be displayed in the GUI when the project is executed by a client 110. As a graphical element, each component has a shape that is defined by one or more graphical features presented in the GUI. The graphical features of components are graphical aspects of the components and are defined by component properties and data values associated with each component property. For example, one graphical feature of a component may be a shape, e.g., sliders, buttons, text fields, and drop down menus. Some components may provide visual representations of machines in industrial processes such as visual representations of pumps, gauges, dials, levers, motors, conveyor belts, tanks, ovens, etc. For example, a component may be a visual representation of a temperature scale. In another example, the component may present a slider that is oriented horizontally. For example, component representing an oven might be a visual representation of an oven and may have component properties such as label, location within the view, color, size, oven temperature, oven humidity, and so forth. In some embodiments, some component properties may store information that does not necessarily influence display of the component in the GUI, but may store additional information about the component or about a data source that may be associated with the component. For example, a designer may choose not to display oven humidity, even though humidity is a component property stored as a data value associated with the oven component.

Additionally, components may have one or more behavioral features. Behavioral features can accommodate various other operations by the gateway system. Examples of behavioral features include defining an input option (minimum or maximum on a numeric input field, type in a number, etc.), configuring accessibility permission to add alter or remove access to the functionality of the component, switching between whether the component is able or not to be interacted with, detaching the way the component appears when disabled from what happens to the component data model, displaying part of a large data set and preloading other portions to enable scrolling without exhaustive loading of the entire data set (e.g., with a large array comprising 100,000 items that cannot be completely displayed by a component in a current configuration, preloading some of the items in the array for scrolling functionality), resizing one or more dimensions of a container layout, creating one or more windows, repositioning windows, etc.

Component properties may be categorized into general component properties, positional component properties, metadata component properties, and custom component properties. The general component properties may be similar to general view properties described above for the views which are general properties that are present when a component is initially placed into a view—in other words, general component properties are a standard set of component properties that accompany each initial placement of a component in a view. The positional properties describe a relationship of the component to other items (e.g., components, containers, views, and/or pages). The positional component properties may further describe a display position of the component within a displayed view in the GUI. For example, the view may be 300 pixels by 300 pixels and the component may be 50 pixels by 50 pixels centered at the coordinate of [10 pixels, 100 pixels]. The metadata component properties provide additional information about a component. For example, a metadata component property may specify a name of the component, a component description, or a date or time stamp of component creation or last modification. The custom properties may be user-defined and can be specific to each component.

The component property store 220 stores information about components (i.e., "component properties") that can be included in a GUI. In particular, the component property store 220 stores property trees that define the properties of the components. A property tree is a data structure comprising a collection of nodes, wherein each node defines some property related to the component. In one embodiment, each node includes a value, a quality, a timestamp value, and a configuration. The multiple values associated with a node are sometimes referred to in this document as a "data value," where a data value is understood to be a tuple of multiple values associated with a node. The quality component is an encoded value that describes the reliability or error state associated with the value. Various quality values may be assigned to various error states defined within the gateway system 130. For example, one quality value corresponds to values that are good, a few quality values correspond to a status of a data source (e.g., PLC 150), and another few quality values correspond to statuses regarding execution of other operations while retrieving the values. The timestamp value records a time and date indicative of when the value was derived. The configuration of a node includes information about data bindings and script handlers that may be associated with the node. The value itself may be a number, a string, a null type, a Boolean, a dataset (i.e., a table-like structure of an ordered collection of rows and columns of information), an array forming an ordered sequence of other nodes in the property tree, or an unordered collection of other nodes.

By virtue of nodes whose values can be an array of other nodes or an unordered sequence of other nodes, a single node is able to encapsulate an arbitrarily structured, deeply nested collection of information, i.e., a tree data structure. These "property trees" are used to define the properties of the components in the GUI.

The component property store 220 stores a component data model for each GUI component. A component data model comprises nodes that represent component properties structured into property trees, the structure of which trees is sometimes referred to herein as a "component hierarchy." Since component properties are represented by nodes in property trees, a component property may be associated with a data value or with a subtree of the component hierarchy comprising additional nodes. In one embodiment, each component property may additionally be assigned a name that identifies the component property.

The source data store 230 stores source data in the form of source data models. A source data model comprises data values structured into a source hierarchy where a source hierarchy is a data structure, such as a tree structure. Source data may be received by the gateway system 130 from a data production system 140. As described above, a data values are tuples of one or more values of various types. Value types include a Boolean type, a number type (e.g., INT2 type, INT4 type, INT8 type, FLOAT4 type, FLOAT8 type, etc.), a string type, a date and/or time type, a color type, etc.

PLC tags are one type of data that can be stored as data values in a source hierarchy (e.g., a hierarchical nested structure) within the source data store 230. That is, a hierarchy of data values (e.g., PLC tags) may be used to represent a set of values and how they relate to an entity such as various values associated with a piece of machinery. For example, an oven may be represented by an "oven" data value or PLC tag, which may have child data values associated with PLC tags that report temperature, humidity, pressure, and the like. Data values in the source data store 230 (i.e., in a source data model) can be arranged in inheritance trees, like objects in an object-oriented programming scheme. In some embodiments, this allows data bindings to dynamically reconfigure structural information of user interface components to match the structure of a data value object. For example, a designer may use the system to design a screen set up to show one oven with a dropdown menu that allows the user to select from among 1000 available ovens to view. In this example, the graphical user interface at a client 110 would update in real time to show the user the selected oven, without the designer having to have individually configured each of the different oven views manually when designing the GUI. Instead, the designer would have configured the view to show an oven object and then the gateway system 130 can determine which properties and components to display for each of the individual ovens based on the PLC tags and other data values in the source data model for each of the ovens. This can also be useful in cases of user defined types of source data models, such as when a designer defines an inheritance hierarchy from a source tree structure for a new set of sources.

In one embodiment, a data model may correspond to an entity associated with a data source or industrial process. For example, a data model associated with an oven via a data production system 140 may comprise a set of data values corresponding to oven name, oven temperature, oven humidity, and the like (e.g., as obtained from PLC tags). A data model may also comprise subsets including other data models. For example, a data model associated with all of the ovens in an industrial bakery might include a first data value indicating a number of ovens and may further include an array comprising data models for each of the ovens. In this way, data models are structured into a hierarchy.

As another example, a data model could include data received from a data production system 140 comprising a web server that hosts a RESTful API. The data model in such a case may comprise data values from a response to a query of the API, preserving the structure of the query response in the structure of the data model. For example, if the API response is received in JavaScript Object Notation (JSON), the data model store 230 stores the data values in the same hierarchical structure as the JSON response. Notably, a data model does not necessarily include identifications of the individual data values, as is the case of data stored in the component property store 220 in which data values are stored in association with component properties.

The client profile store 240 stores client profiles for clients 110 and 115 in communication with the gateway system 130. The client profile store 240 maintains a client profile for each client 110 in communication with the gateway system 130. Client profiles may include various information including identifiers (e.g., IP address, MAC address, Bluetooth address, etc.), historical logs, accessibility settings, generated reports, current or historical geolocation(s) according to established gateway sessions, etc. In some embodiments, projects are only designated for access by permitted client profiles. Only clients 110 with client profiles that have been granted access can access projects by the gateway system 130. In other embodiments, the client profile store 240 may classify certain client profiles associated with design clients 115 with the permission to access the design module 270 to provide one or more modifications to one or more projects in the project store 210. Additional embodiments may include various other permissions assigned to individual profiles, e.g., a client profile named "Online Display" can only view the project and cannot provide any inputs through the GUI.

The message store 250 stores message handlers associated with components in a project. A message handler is associated with a component, wherein the message handler is assigned to receive messages for the component. For example, the component through an associated message handler receives a message to adjust one or more features of the component. Features that may be affected by a message include graphical features or behavioral features. Each message handler comprises a scope definition and a message type definition. The scope definition of a message handler points to a level in the project hierarchy where the message handler may receive messages directed to that level in the project hierarchy. In an example, a project hierarchy may have a first level with one or more pages, a second level with one or more views in each page, a third level with any combination of containers and components in each view, and optional subsequent level with components in containers. In this example, the scope definition of the message handler may be one of the first level, the second level, the third level, and any other subsequent levels. In other examples, the project hierarchy may have different levels associated with sessions, pages, view, and/or components. The message type definition of the message handler directs the message handler to read messages with a matching message type. For example, a message handler of a component has a scope definition indicating the page in which the component resides and a message type definition of "motor." This message handler receives messages directed to the scope of the page and with a matching message type of "motor." The message handler also has a handler script implementation that defines a response of the message handler to reading a message. For example, the handler script instructs the component to display some portion of the message.

Figure 3:
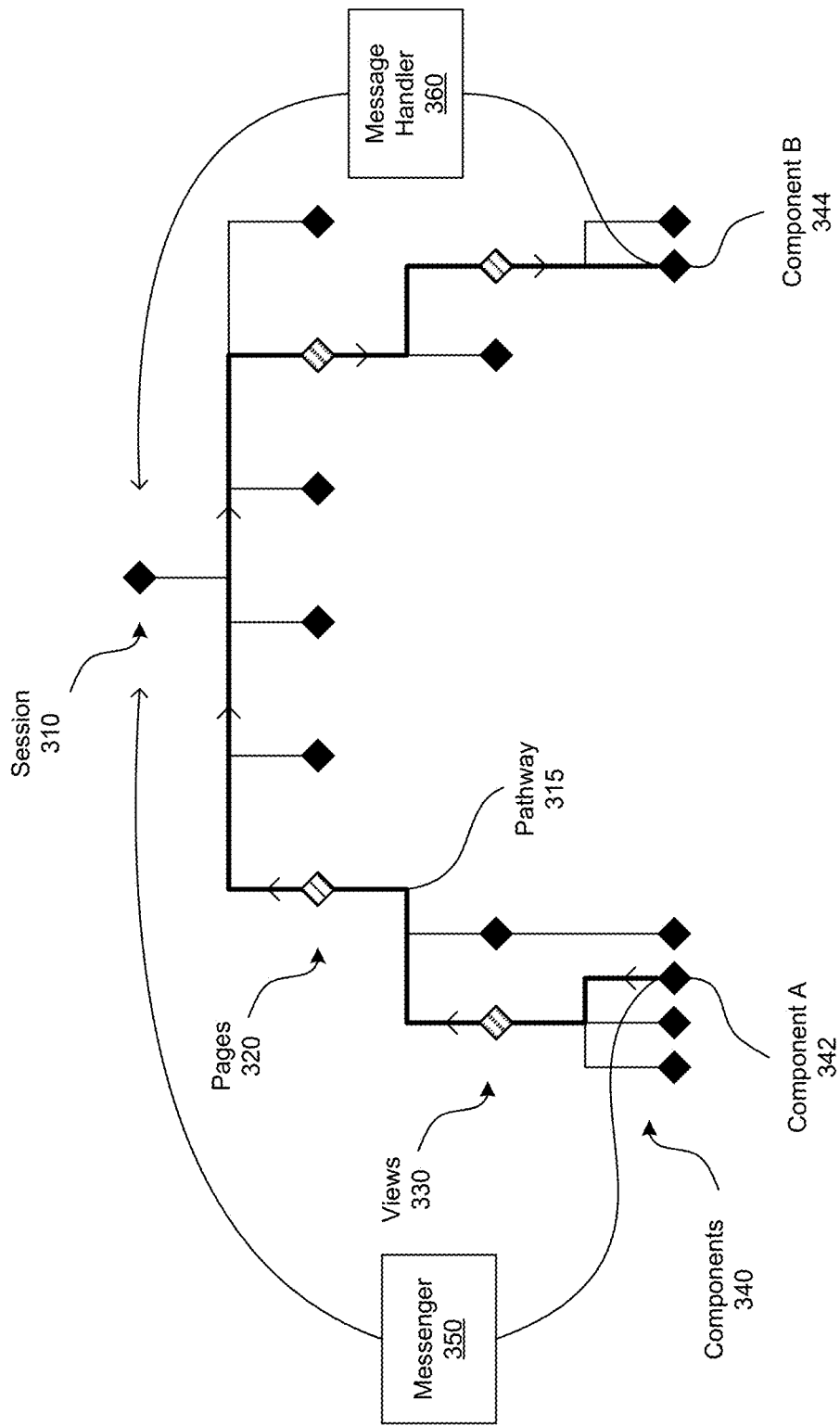
FIG. 3 illustrates delivery of a message in tree diagram of a project hierarchy, in accordance with an embodiment.

The message store 250 also stores messengers associated with components in a project, e.g., such as messenger 350 as described in conjunction with FIG. 3. A messenger associated with a component may send messages to other components in a project. For example, the component through an associated messenger may send a report of data values to another component for display. The messenger includes a scope argument, a message type argument, and a payload option. The scope argument and the message type argument are complements to the scope definition and the message type definition that define a message handler as described above. In a similar sense, the scope argument indicates a level of the project hierarchy to deliver the message, e.g., deliver to a specific page in the project or to a specific view in the project, etc. Also similarly, a message's message type argument indicates the message to be read by message handlers with the message type definition matching the message type argument. The payload option is a manner by which a client 110 or 115 may provide a payload for transmission by the messenger. The payload includes contextual data indicating to a message handler whether an individual message is applicable to that message handler, add another level of granular control to individual messages handlers. For example, a specific message handler has a specifically defined reaction to reading a message with contextual data for a specific error message. The payload may also include an object comprising zero (null object) or more data values. In one embodiment, the payload option defined by a design client 115 includes the payload; whereas, in other embodiments, the payload option provides an input, through which a client 110 or 115 may provide the payload. For example, the payload option may describe determining screenshot of a component's current status as the payload when a button on the associated component is selected. The messenger may then provide the screenshot as the payload to appropriate message handlers identified by matching the scope definition and the message type definition to the messenger's scope argument and message type argument, respectively.

The event bus module 260 manages delivery of messages. In some embodiments, the event bus module 260 is a scripting API for delivering messages. Delivery of messages includes generating message handlers, generating messengers, receiving payload inputs, and distributing the messages to the message handlers. For generation of message handlers, the event bus module 260 receives a definition input for the message handler, e.g., from a design client 115 via a gateway session, to define a message handler associated with a component in the project for reacting to messages for the component. Once received, the event bus module 260 may generate a message handler associated with a component and may provide the message handler to the message store 250 for storage. For generation of messengers, the event bus module 260 receives another definition input, e.g., from a design client 115 to the gateway system 130, to define a messenger associated with a component. Similar to the message handler, the event bus module 260 may generate a messenger associated with a component and may provide the messenger to the message store 250 for storage. When a message input is for a messenger, e.g., via a payload option, the event bus module 260 packages a message that includes the scope argument, the message type argument, and the payload for distribution to appropriate message handlers. The event bus module 260 identifies the appropriate message handlers to receive the message by identifying message handlers with scope definitions and message type definitions matching the scope argument and the message type argument of the message, respectively, originating from the messenger. When an appropriate message handler is identified, e.g., from the message store 250, the event bus module 260 distributes the message including the payload to that message handler. In some embodiments, the event bus module 260 also executes responses to messages defined for the message handlers, e.g., via the handler script implementation. In other embodiments, another module of the gateway system 130 executes the responses.

The design module 270 generates and modifies projects in the project store 210. The design module 270 can generate new projects that may be stored in the project store 210. When generating a new project, the design module 270 may also define a structure of the project in a project navigation hierarchy a tree structure of including number of pages, number of views per page, number of containers or components per view, number of components per container, etc. In some embodiments, a page may contain any combination of pages, views, containers, and components. In some embodiments, a view may contain any combination of views, containers, and components but not pages. In some embodiments, a container may contain any combination of containers and components but neither pages nor views.

Once a structure of the project is defined, the design module 270 may set one or more properties of items in the project. For example, the design module 270 may set one or more properties such as the name of each of the pages, sizes of each view within a page, a color background of views within a page, etc. The design module 270 may further set properties of components placed within the project. In some embodiments, the design module 270 receives a request to establish a data binding between a component property and a source data model. Once a project is created, the design module 270 may modify projects in the project store 210.

In some embodiments, the design module 270 may set accessibility settings for each project. For example, the design module 270 assigns one or more design clients and their corresponding client profiles with access to certain projects. When a design client 115 attempts to communicate with the design module 270 to edit a project, the design module 270 may verify that the design client 115 is associated with a client profile that has designated with access to editing the project. Once verified, the design client 115 provides design input corresponding to edits of the project to the design module 270 through a design GUI which then causes the design module 270 to edit the project in the project store 210 according to the design inputs. Included in design edits are generation or modification of messengers and message handlers associated with various components in the project. In other embodiments, the design module 270 may set tiers of accessibility settings for clients. For example, a first tier allows editing of certain items in the project (e.g., views and components), a second tier allows editing for all components in the project, a third tier allows editing of one or more designated components in the project, and a fourth tier allows viewing of the project, etc.

The client interfacing module 280 moderates communication between the gateway system 130 and one or more clients 110 or 115. The client interfacing module 280 receives a request from one or more clients 110 or 115 to communicate with the gateway system 130 for accessing a project in the project store 210. Each request by a client 110 or 115 may include a client profile identifier that specifies a client profile associated with the client 110 or 115 and may further include a project identifier that specifies a project in the project store 210. In further embodiments, a request includes a type of client (e.g., application on an external device communicating with the gateway system 130, a web browser on a mobile device, etc.). In other embodiments, a request also includes one or more inputs that may affect display of the project. For example, the request may be a URL web address that also provides an input to a component property in the project. The client interfacing module 280 may access a client profile store 240 to identify a client profile for each client based on the client profile identifier. The client interfacing module 280 accesses the project store 210 for the project that is requested to be accessed by the client. The client interfacing module 280 may further verify accessibility settings for the project against the client profile to determine what access to provide the client. In embodiments described above with tiers of accessibility, the client interfacing module 280 determines a set of operations that the client is permitted. If the client is a design client 115 as determined by the client profile of the design client 115, the client interfacing module 280 may provide the design client 115 with complete access to modify the project.

Once a client profile is verified to have access to the project, the client interfacing module 280 generates a gateway session for the client 110 or 115 through which the client interfacing module 280 may provide a GUI or a design GUI. Through the gateway session, the client 110 or 115 may provide inputs, subject to accessibility settings, that may include messages to various components during its gateway session.

The client interfacing module 280 provides a graphical user interface (GUI) to a client 110 for accessing a project. In one instance, the client 110 is permitted to view the project in the project store 210 based on accessibility settings. The client interfacing module 280 accesses the project store 210 to retrieve the requested project. The client interfacing module 280 renders a GUI that presents the project to the client 110 based on properties stored for the project. In embodiments where the project includes one or more components, the client interfacing module 280 accesses the component property store 220 to retrieve data values corresponding to component properties. Based on the retrieved data values for the component properties, the client interfacing module 280 may render the components of the project in the GUI. The GUI generated by the client interfacing module 280 for the client 110 will be described further below in FIGS. 5B, 7A-C, and 8.

In some embodiments, the client 110 may have permission to provide one or more inputs, e.g., a message input. The client interfacing module 280 may receive the message inputs and may provide the message inputs to the event bus module 260. The event bus module 260 then delivers the message according to the received message input, e.g., identifying appropriate message handlers that match the message input, executes responses defined by the handler script implementation, etc. The event bus module 260 may provide effective responses back to the client interfacing module 280 for updating of the GUI.

The client interfacing module 280 provides a design GUI to a design client 115 for modifying a project. In one instance, the design client 115 is permitted to modify the project based on accessibility settings. The client interfacing module 280 accesses the project store 210 to retrieve the requested project. The client interfacing module 280 renders a design GUI that presents the project to the client 110 based on properties stored for the project. In embodiments where the project includes one or more components, the client interfacing module 280 accesses the component property store 220 to retrieve data values corresponding to component properties. Based on the retrieved data values for the component properties, the client interfacing module 280 may render the components of the project in the design GUI. The client interfacing module 280 also renders one or more additional design elements for aiding in modification of the project. One example of an additional design element is the ability to provide a definition input for defining a message handler, e.g., message handler 360 as described in conjunction with FIG. 3. The design client 115 provides inputs (including definition inputs) through the design GUI which is then received by the client interfacing module 280. The client interfacing module 280 may relay the inputs (including definition inputs) to other modules of the gateway system. In embodiments with definition inputs, the client interfacing module 280 provides the definition inputs to the event bus module 260 which defines the message handlers. The design GUI generated by the client interfacing module 280 for the design client 115 and its various graphical elements will be described further below in FIGS. 5A and 6A-6C.

In some embodiments, a client 110 or 115 requests a specific item in the project for display in a GUI to the client 110 or 115. For example, a client 110 is attempting to view a page from a project and may then provide a request with a URL web address that may be used to retrieve the page by the client interfacing module 280. The client interfacing module 280 retrieves the project and identifies the specified item in the project. The specified item may be a specified page, a specified view, a specified container, or a specified component. The client interfacing module 280 determines what other items are contained with the specified item. The client interfacing module 280 then retrieves properties from the project store 210 and/or component properties for components within the specified item. The client interfacing module 280 then generates a GUI with the retrieved properties and component properties and presents the GUI to the client 110 or 115. In further embodiments, the client 110 or 115 may provide navigational inputs to display another item in the project. For example, the client 110 or 115 provides a navigation input to change from one page to another; in response, the client interfacing module 280 identifies the subsequent page to be displayed and updates the GUI to display the subsequent page.

Component Messaging Example

FIG. 3 illustrates delivery of a message in tree diagram of a project hierarchy, in accordance with an embodiment. When a gateway session is initiated for a client 110 or 115, the gateway system 130 generates a GUI to be provided to the client 110 or 115. The GUI includes items in the project, e.g., one or more pages, views, components, etc. In this example illustration, the project hierarchy includes a first level of the session 310, a second level of pages 320, a third level of views 330, and a fourth level of components 340 which includes a component A 342 and a component B 344. Other embodiments of the project hierarchy can use other level designations. In this scenario, a client (e.g., a design client 115) is attempting to establish a manner in which messages may be delivered from component A 342 to component B 344.

In a conventional method, the client defines a messenger at component A 342 that identifies component B 344 via a pathway 315 from component A 342 to component B 344. For example, the client defines the pathway 315 shown in bold that traces from component A 342 through its originating view and its originating page and then through the page and the view wherein lies component B 344. This conventional method is too rigid in situations where component B 344 may be moved around or renamed, thereby changing the specific pathway 315 between component A 342 and component B 344. The client would be required to redefine the pathway 315 or encounter failed delivery of messages due to an outdated pathway.

According to the gateway system 130, the client (e.g., the design client 115) defines a messenger 350 at component A 342 and a message handler 360 at component B. The messenger 350 is an embodiment of the messengers described in FIG. 2 and is defined by a message type argument, a scope argument, and a payload option. The scope argument of the messenger 350 directs messages sent from the messenger 350 to a specific level of the gateway session, in this example the session level 310. The message type argument of the messenger 350 directs messages sent from the messenger 350 to message handlers with a matching message type definition. The message handler 360 is an embodiment of the message handlers as described in FIG. 2 and is defined by a message type definition, a scope definition, and a script implementation. The scope definition of the message handler 360 indicates a specific level of the gateway session where messages are sent that the message handler 360 can receive. The message type definition of the message handler 360 is used to identify messages with a matching message type definition. In the illustration of FIG. 3, the messenger 350 is defined such that messages originating from the messenger 350 are sent to the session level 310 based on the scope argument. The message type argument may be, for example, "motor-01". The message handler 360 is defined to receive message sent to the session level 310 based on the scope definition. The message type definition may be, for example, "motor-01". In order for messages originating from the messenger 350 to be distributed to the message handler 360, the event bus module 260 checks whether the message type definition matches the message type argument of the message. In this example, the event bus module 260 would determine the message handler 360 to be an appropriate message handler for receiving the message originating from the messenger 350 given the matching scope and message type.

With this method of delivering messages, many advantages may be afforded to the gateway system 130. For one, movement of components and their associated message handlers does not affect the message handler abilities to read messages at the same scope. For example, a component may be moved to a different view or container thereby changing a pathway between a messenger and the component's message handler. This changed pathway would not affect the message handler's ability to read messages sent by the messenger if the messenger and message handler able to communicate message prior to the changed pathway. Another benefit is a scalability provided by defining messengers and message handlers. In a conventional method, each messenger would need to designate each and every component to deliver the message. In the method described herein this disclosure, to send a message to any number of message handlers, the numerous message handlers may be configured to read the message according to the scope definition and message type definition. If another message handler is to be added to read a message, then the messenger doesn't need to be changed, but the new message handler is configured to read such messages from that messenger.

Design GUI

Figure 4:
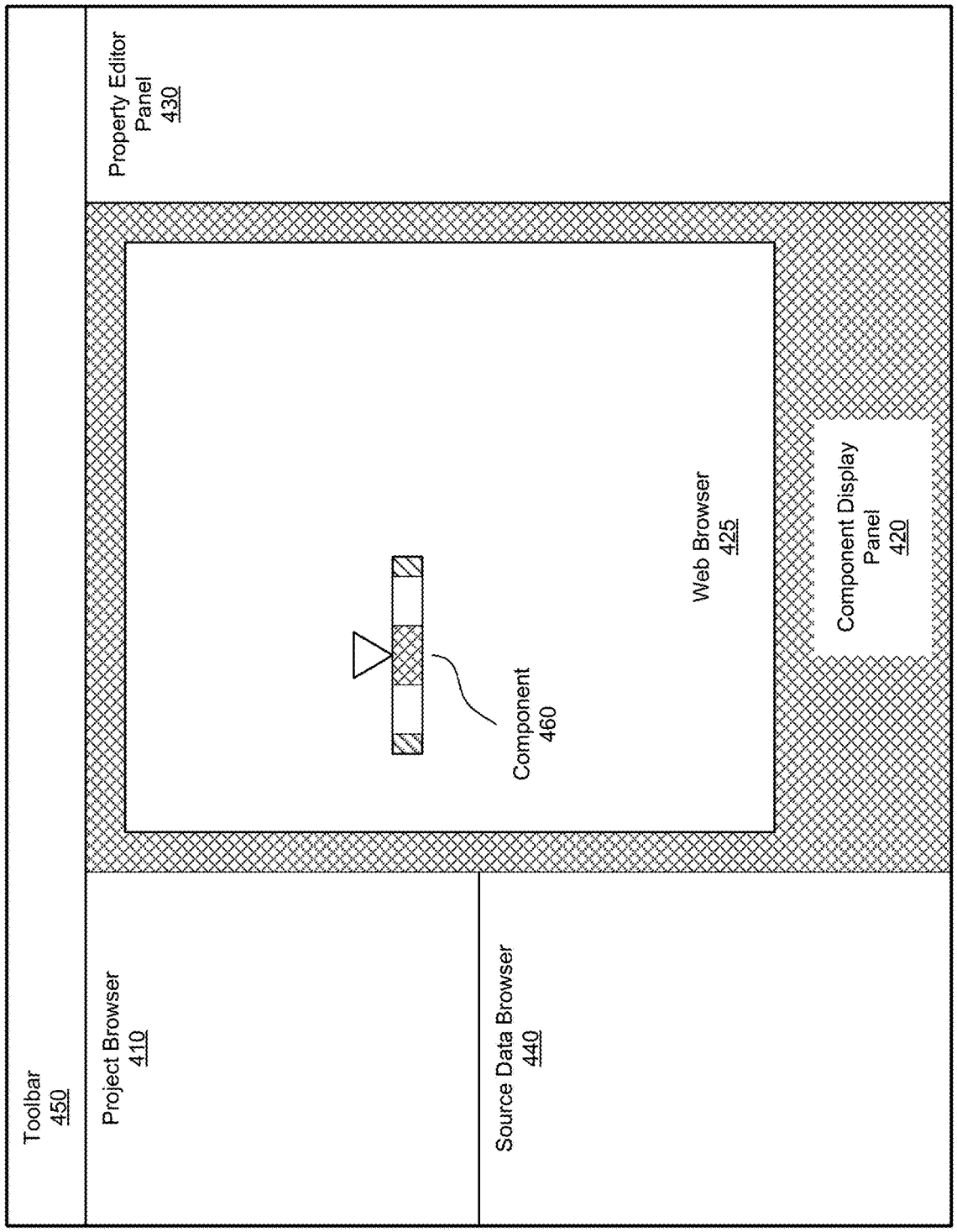
FIG. 4 is an illustration of a design graphical user interface (GUI), in accordance with some embodiments.

FIG. 4 is an illustration of a design GUI 400, in accordance with some embodiments. The client interfacing module 280 generates the design GUI 400 and provides the design GUI 400 to one or more design clients 115 for modification of one or more projects. The design GUI 400 includes a project browser 410, a component display panel 420, a property editor panel 430, a source data browser 440, and a toolbar 450 which are graphical elements in various portions of the design GUI 400. In other embodiments, the design GUI 400 may have additional or fewer graphical elements than those listed herein. Additionally, the functions described for the listed graphical elements may be variably distributed amongst the other graphical elements. In other embodiments, the placement of the graphical elements relative to one another in the design GUI 400 may be different.

The project browser 410 displays a project navigation hierarchy. In the illustration of FIG. 4, the project browser 410 is placed in a top left portion of the design GUI 400. The project browser 410 may also be referred to as a project browser portion of the GUI 400. The client interface module 280 generates the design GUI 400 for presentation and modification of a requested project from the project store 210 of the gateway system 130. The retrieved project may have many items such as pages, views, containers, and/or components included in the project. These items in the project may be structured in a project navigation hierarchy, which is described further in detail in the discussion of the components of FIG. 2, and an exemplary project hierarchy is shown in FIG. 3. In the project navigation hierarchy, there may be any number of pages, any number of views, any number of containers, or any combination thereof arranged in a tree structure. The project browser 410 may present one or more items in the project navigation hierarchy. In other embodiments, the project browser 420 is configured to receive an edit input to edit one or more properties of items in the project hierarchy.

In some embodiments, the project browser 410 is configured to receive a navigation input of navigating to a page, a view, a container, or a component in the project navigation hierarchy. For example, the designer using the design GUI 400 may provide, via a design client 115, a selection input of a view in the project. In response to selection of the view in the project browser 410, the project browser 410 visually distinguishes the selected view in the project browser 410. Moreover, the client interface module 280 may update other graphical elements in response to the selection input of the view.

The component display panel 420 displays a view of a project. In the illustration of FIG. 4, the component display panel 420 is placed in a middle portion of the design GUI 400. The component display panel 420 may also be referred to as a component display portion of the GUI 400. The component display panel 420 contains a web browser 425 that is another graphical element which is unique to a gateway session. The web browser 425 is a graphical element in the GUI 400 that presents visual information in a web page format. The web browser 425 displays a view that is currently selected in the project navigation hierarchy which serves as a representation of how other web browsers or clients accessing the view would display the view. In some embodiments, the web browser 425 can display other items in the project as well, including a page or a container. When an input selecting a different view is received by the project browser 410, the component display panel 420 updates the web browser 425 to display the different view.

The component display panel 420 displays, in the web browser 425, one or more components in a selected view. The component display panel 420 displays any components previously placed in the selected view in the web browser 425. The component display panel 420 displays each component according to a set of component properties that define an appearance of the component in the web browser 425. For example, an oven component may have features that include a graphical thermometer scale, a visual representation of an oven, a graphical pressure scale, an oven volume capacity percentage, etc.

The component display panel 420 is configured to receive a selection input of a component displayed in the web browser 425. A designer may interact with the component in the web browser 425. In response, the component display panel 420 may visually distinguish the selected component in the web browser 425. In response to the selection input, the component display panel 420 may be further configured to provide a variety of actions for the selected component. In one or more embodiments, the actions include defining a message handler and/or a messenger to be associated with the selected component. The component display panel 420 may receive input choosing one of the available actions. In response to an input to define a message handler, the component display panel 420 displays a message handler editor window for completion of defining the message handler (which will be described in more detail in FIGS. 5A, 6A-C, and 8). Similarly, in response to an input to define a messenger, the component display panel 420 display another window for completion of defining the messenger (which will be described in more detail in FIGS. 5B, 7A-C, and 8).

Figure 6A:
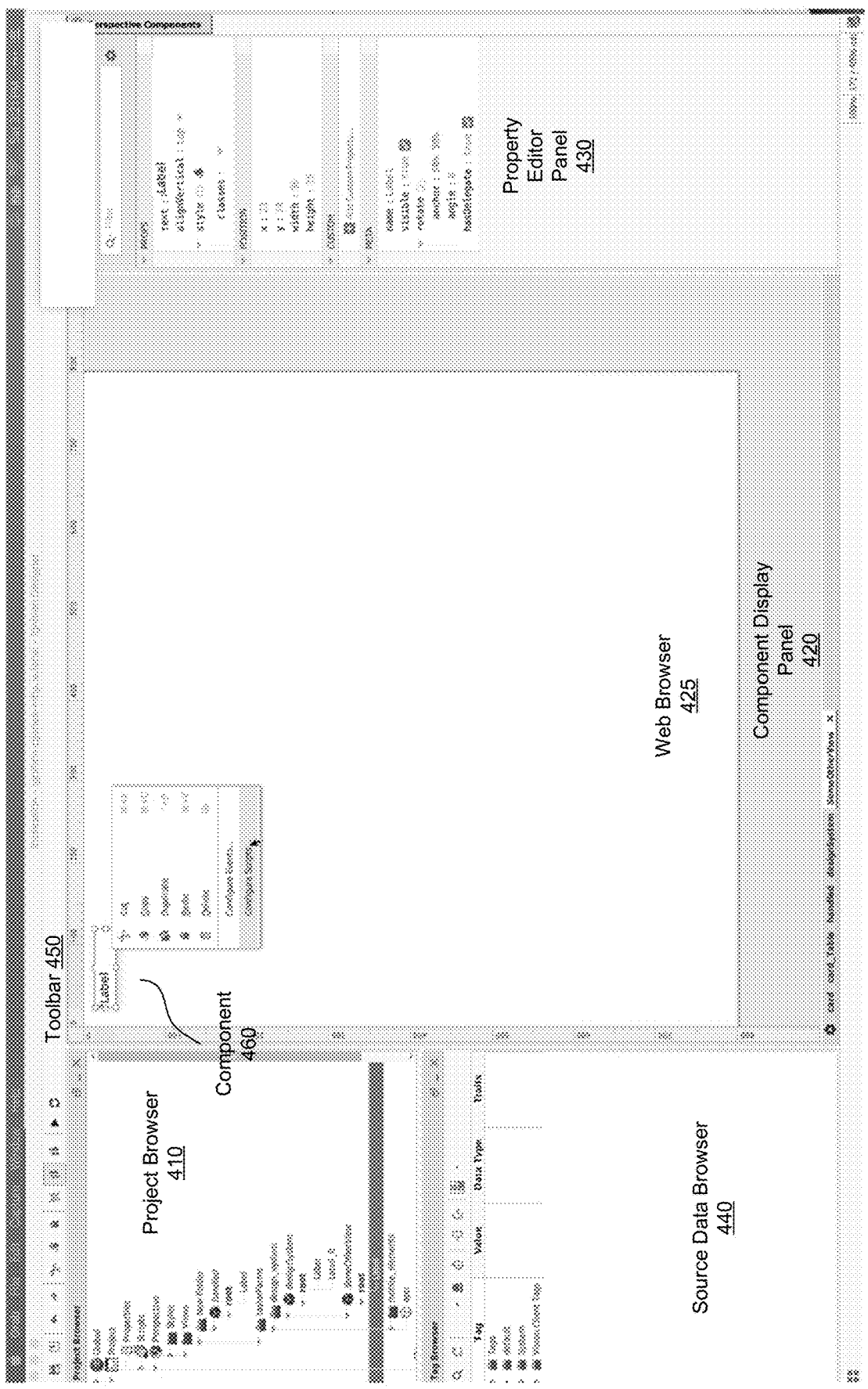
FIGS. 6A-6C are examples of the design GUI and its various graphical elements as described in FIG. 5A, in accordance with some embodiments.

The property editor panel 430 displays a component data model associated with a selected component in the project. In the illustration of FIG. 6A, the property editor panel 430 is placed in a right portion of the design GUI 400. The property editor panel 430 may also be referred to as a property editor portion of the GUI 400. The selection input of the component may be received at the component display panel 420. When a component is selected, the property editor panel 430 displays the component data model associated to the selected component. The displayed component data model comprises a set of component properties that are structured in a component hierarchy. Each component property may have a data value which may also be displayed by the property editor panel 430. Pending any changes to the component properties, the property editor panel 430 updates the displayed set of components properties based on the changes.

The property editor panel 430 is configured to receive edit inputs corresponding to editing the component data model. In the displayed set of component properties, a designer may provide an edit input, via the property editor panel 430 for editing the component data model. The editing of the component data model may include any combination of adding/removing/updating a data value assigned to a component property, adding/removing a component property, naming/renaming a component property, and moving a component property within the component data model. When the edit input is provided, the property editor panel 430 may relay the edit input to the design module 270 for updating the component properties in the component property store 220. In embodiments where the edit input corresponds to adding/removing/updating a data value assigned to a component property, the property editor panel 430 updates the component property in the displayed component data model to reflect the addition/removal/update of the data value. In embodiments where the edit input correspond to adding/removing a component property, the property editor panel 430 updates the displayed component data model to reflect an added component property or a removed component property from the component data model. In embodiments where the edit input corresponds to naming/renaming a component property, the property editor panel 430 updates the component data model to display the updated name of the component property. In embodiments of the edit input corresponding to moving a component property within the component data model, the property editor panel 430 updates to reflect a change in the position of the component property with a potential change in the component hierarchy as well.

The source data browser 440 displays one or more source data models. In the illustration of FIG. 4, the source data browser 440 is placed in a bottom left portion of the design GUI 400. The source data browser 440 may also be referred to as a source data browser portion of the GUI 400. The source data may be retrieved from the source data store 230 wherein the source data models are stored. Each source data model comprises data values structured into a source hierarchy. The source data browser 440 displays a source data model with the data values structured in the source hierarchy. In some embodiments, the source data browser 440 may receive an input specifying a source data model to be displayed. In embodiments where the data values are tuples of one or more data values of various types, the source data browser 440 may present one or more of the data values in the tuples. In one example of a source data as PLC tags provided by an OPC server, the source data may be provided in tuples including a scalar value, a quality value, and a timestamp value. In these examples, the source data browser 440 may present the three data values.

The source data browser 440 may have additional functions for navigating around source data models or for editing source data models. Similar to the navigation inputs discussed above in reference to the project data browser 410, the source data browser 440 may also receive one or more navigation inputs to navigate around various source data models. Similar to one or more edit inputs discussed above in reference to the property editor panel 430, the source data browser 440 may receive edit inputs that may correspond to adding/removing/updating a data value in a source data model, adding/removing a data value in the source data model, or moving a data value within the source data model. The source data browser 440 may additionally relay such edit inputs to the design module 270 for updating source data stored in the source data store 230.

The toolbar 450 displays one or more options configured to receive inputs. In the illustration of FIG. 4, the toolbar 450 is displayed in a top portion of the design GUI 400. The displayed one or more options are graphical icons. When a designer, via a design client 115, clicks on one of the options, the toolbar 450 receives the input of selecting that option. The various options may include but is not limited to creating a new project, adding a page to an existing project, adding a view to an existing project, adding a container to an existing project, opening an existing project, saving a project currently being edited, undoing an input, redoing an input, cutting of an item in the project, pasting of an item into the project, deploying a project, refreshing the design GUI 400, etc. The option of opening an existing project may result in the design GUI 400 displaying in the project browser 410 (or another project browser that may pop up in the design GUI 400) various projects stored in the project store 210. In adding a page, a view, or a container to an existing project, the design GUI 400 may display in the project browser 410 an updated project hierarchy including the added item. Deploying of a project effectively opens access of the project from one or more clients 110 or 115 to access the project via gateway sessions hosted by the gateway system 130. Other inputs listed above are familiar operations in the software GUI field.

Message Handler Editor

Figure 5A:
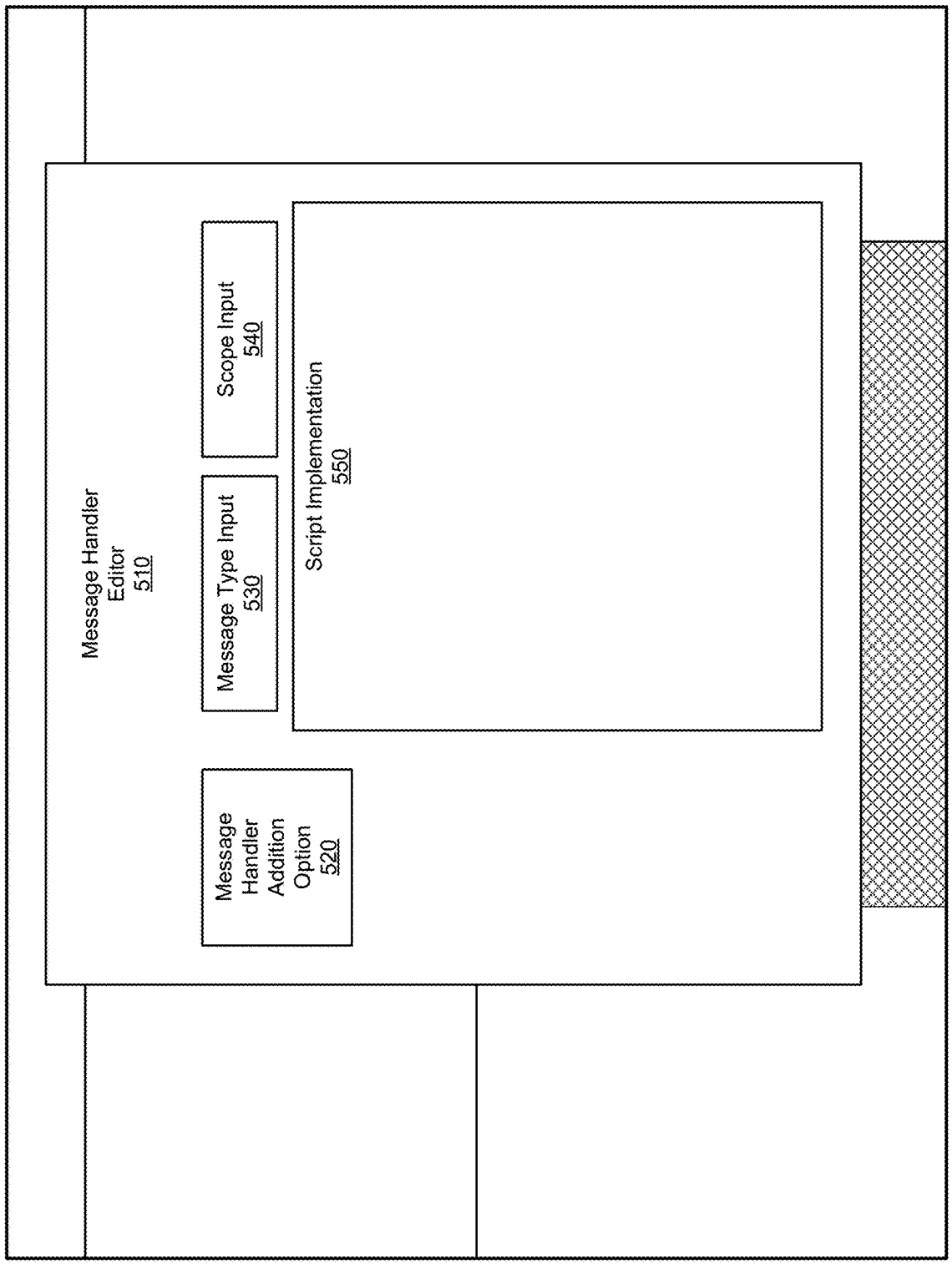
FIG. 5A is an illustration of the design GUI displaying a message handler editor window, in accordance with some embodiments.

FIG. 5A is an illustration of the design GUI 400 displaying a message handler editor window 510, in accordance with some embodiments. In this illustrative example, the design GUI 400 receives an input to define a message handler to be associated with a selected component in the component display panel 420. In response, the design GUI 400 displays the message handler editor window 510. In this illustration, the message handler editor window 510 displays a message handler addition option on a left portion of the message handler editor window 510, a message type input 530, a scope input 540, and a script implementation 550, as inputs for defining the message type definition, the scope definition, and the script implementation of the message handler as described above in FIGS. 2 & 3. In the illustration of FIG. 5A, the message handler editor window 510 may receive an addition input via the message handler addition option 520 to generate a new message handler for the selected component. The message handler editor window 510 then receives definition inputs via the message type input 530, the scope input 540, and the script implementation 550. With the definition inputs, the gateway system 130 may generate a message handler associated to this component.

Figure 6B:
Figure 6C:
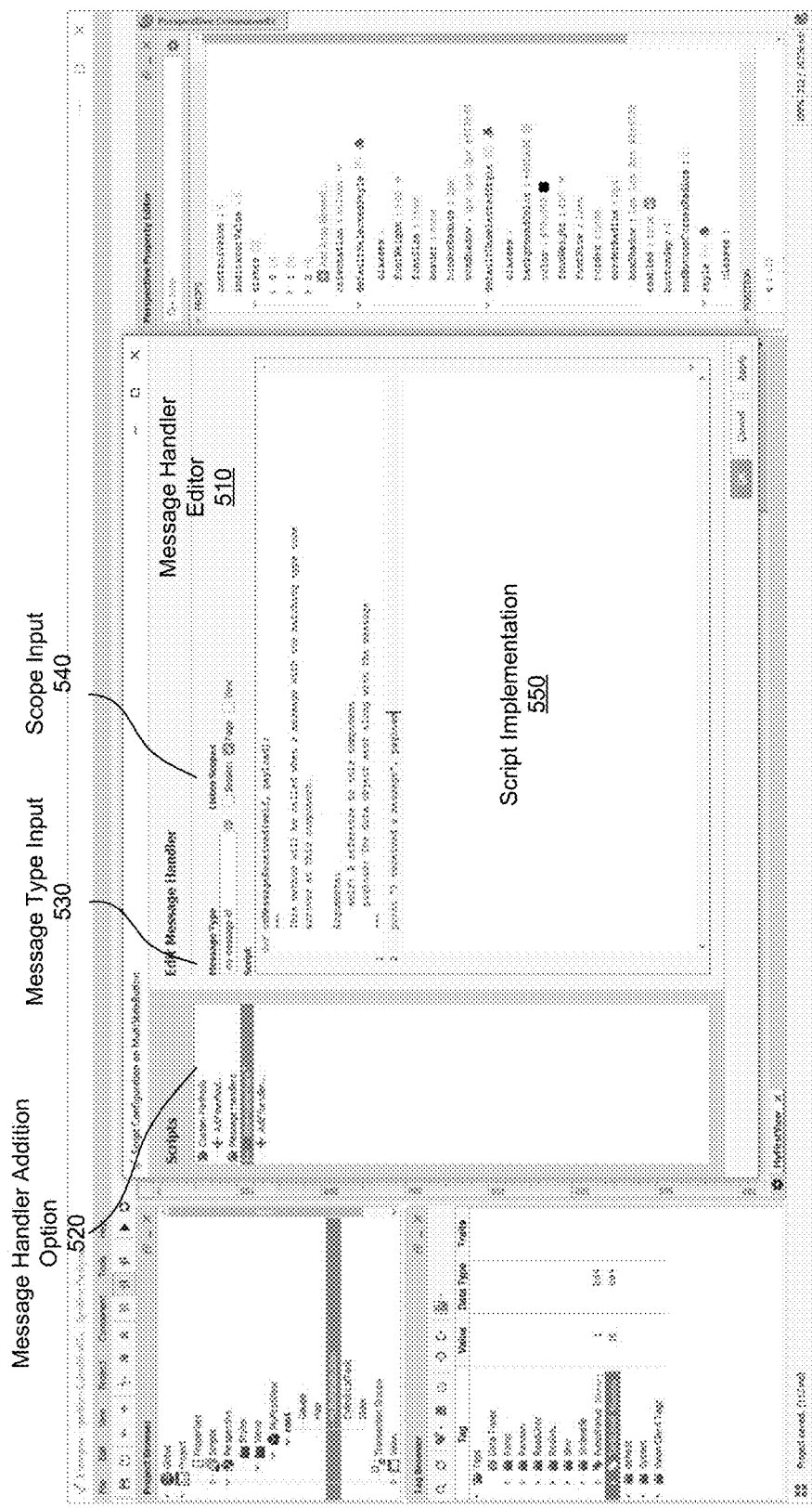

FIGS. 6A-6C are examples of the message handler editor window 510 as described in FIG. 5A, in accordance with some embodiments.

FIG. 6A is an example screenshot of the design GUI 400, in accordance with an embodiment. The design GUI 400 has various graphical elements as described in FIG. 4, including the project browser 410, the component display panel 420, the web browser 425, the property editor panel 430, the source data browser 440, and the toolbar 450. In this screenshot, the web browser 425 already has a component 460 populated in a portion of the web browser. Having received a selection input selecting the component 460, a dropdown menu of a variety of actions are displayed and presented. A mouse pointer clicks on the action in the dropdown menu titled "Configure Scripts . . . ", which corresponds to selection for defining a message handler associated with the component 460.

FIG. 6B is an example screenshot of the message handler editor window 510, in accordance with an embodiment. This screenshot may be a continuation example of FIG. 6A. As seen in this screenshot, the message handler editor window 510 displays a message handler addition option 520 on a left portion of the window. The mouse pointer clicks on the message handler addition option.

FIG. 6C is an example screenshot showing definition inputs of the message handler editor window 510, in accordance with an embodiment. This screenshot may be a continuation example of FIGS. 6A & 6B. As a continuation example of FIG. 6B, when a message handler addition option 520 is clicked on, the message handler editor window 510 displays definition inputs for defining the message handler associated with the component 460. In other embodiments, the definition inputs are displayed when the message handler editor window 510 is opened. The definition inputs include the message type input 530, the scope input 540, and the script implementation 550. In this screenshot, the message type input 530 is a string of "my-message-id", the scope input 540 is checked for the "page" level, and the script implementation 550 responds to receiving a message by printing a confirmation string of "I received a message" and the payload received from the message.

Messenger Editor

Figure 5B:
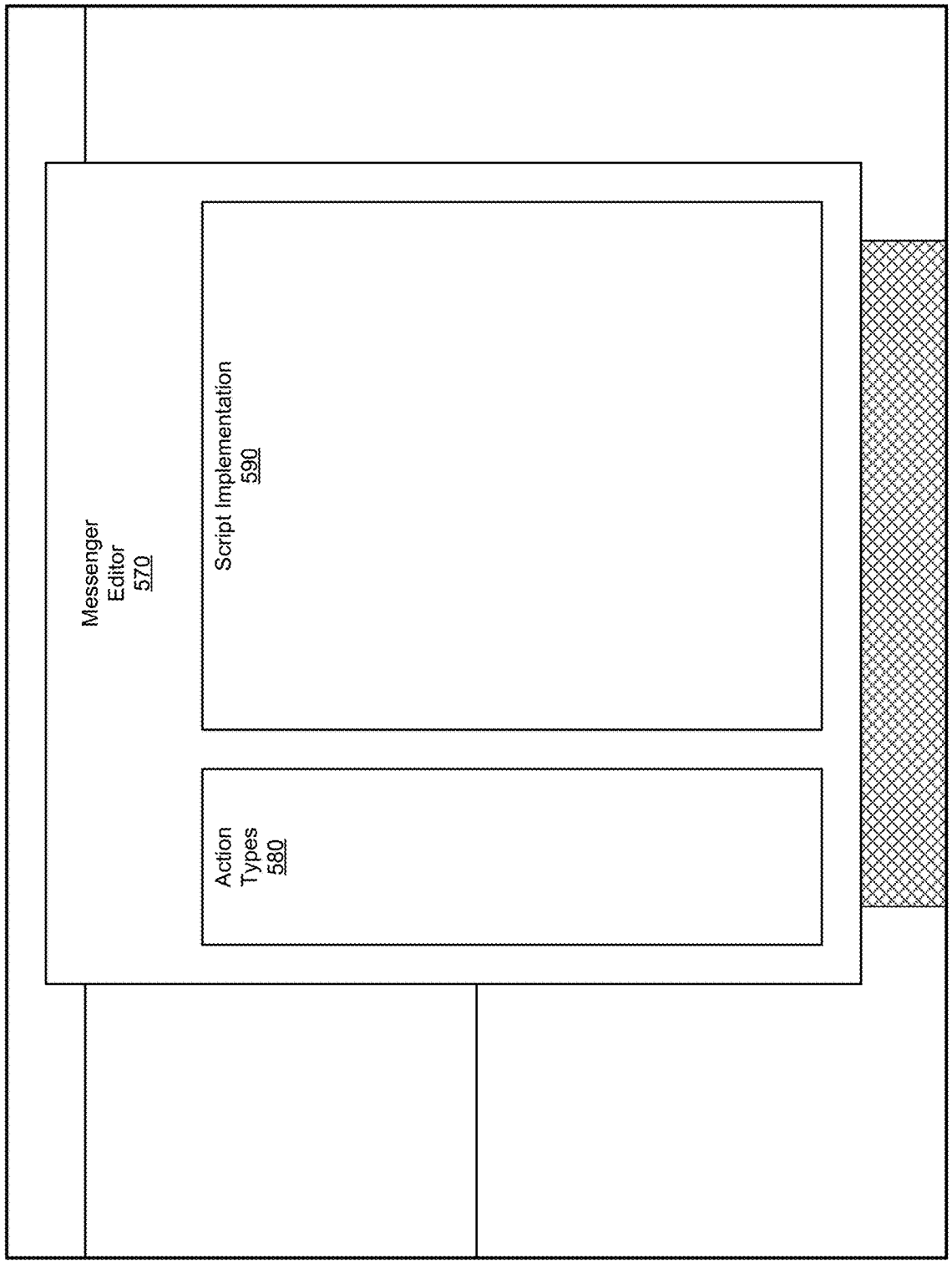
FIG. 5B is an illustration of the design GUI displaying a message application programming interface (API) editor window, in accordance with some embodiments.

FIG. 5B is an illustration of the design GUI displaying a messenger editor window 570, in accordance with some embodiments. In this illustrative example, the design GUI 400 receives an input to define a messenger to be associated with a selected component in the component display panel 420. In response, the design GUI 400 displays the messenger editor window 570. In this illustration, the messenger editor window 570 displays action types 580 on a left portion of the window. In response to selection for implement a script to define the messenger, the messenger editor window 570 displays a script implementation 590 for defining the messenger to be associated with the component. The script implementation 590 may include a message type argument, a scope argument, and a payload option, similar to those described above in FIGS. 2 & 3. The messenger editor window 570 receives a script input, via the script implementation 590 to define the messenger. With the script input, the gateway system 130 may generate a messenger associated to this component.

Figure 7A:
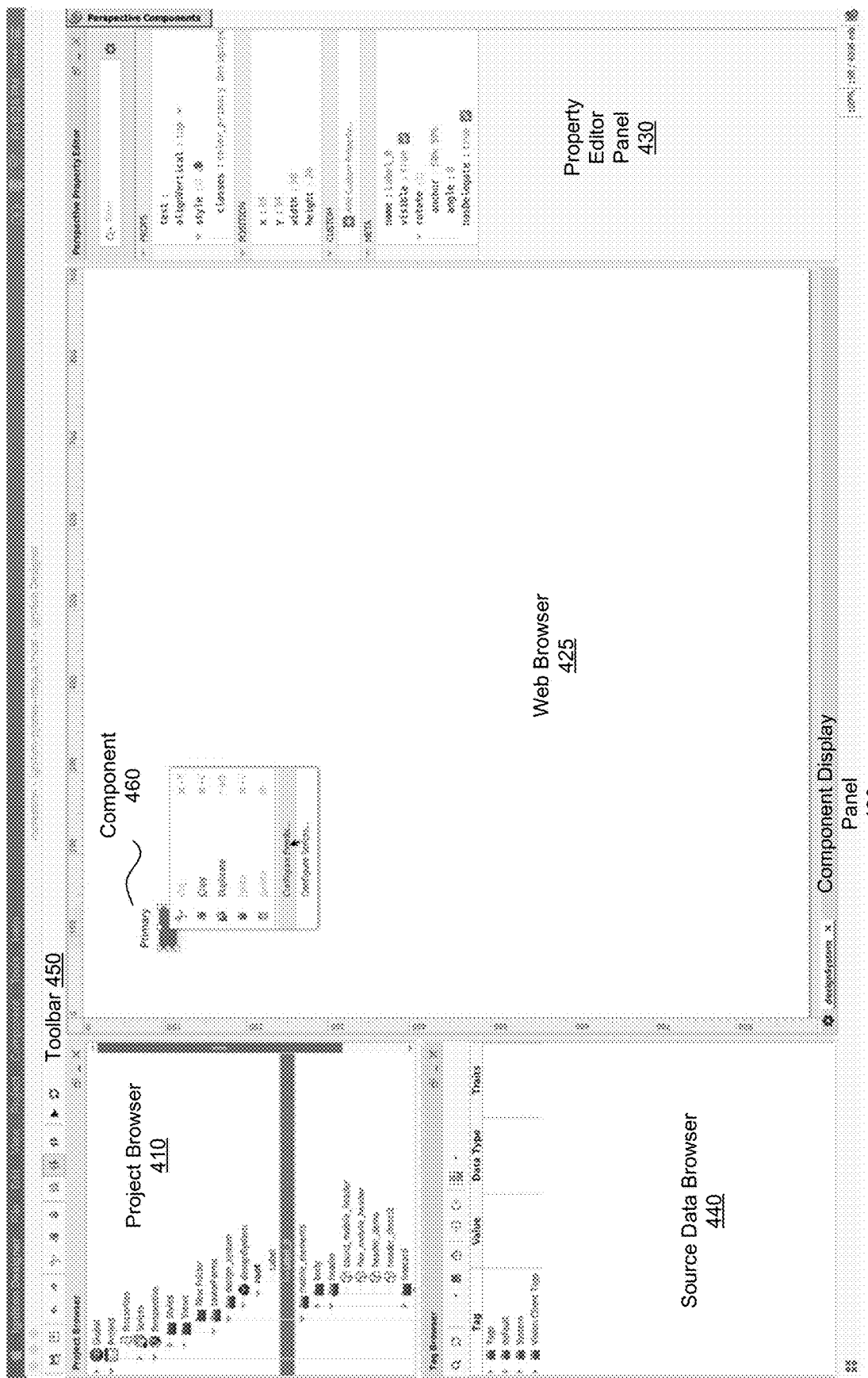
FIGS. 7A-7C are examples of the design GUI and its various graphical elements as described in FIG. 5B, in accordance with some embodiments.
Figure 7B:
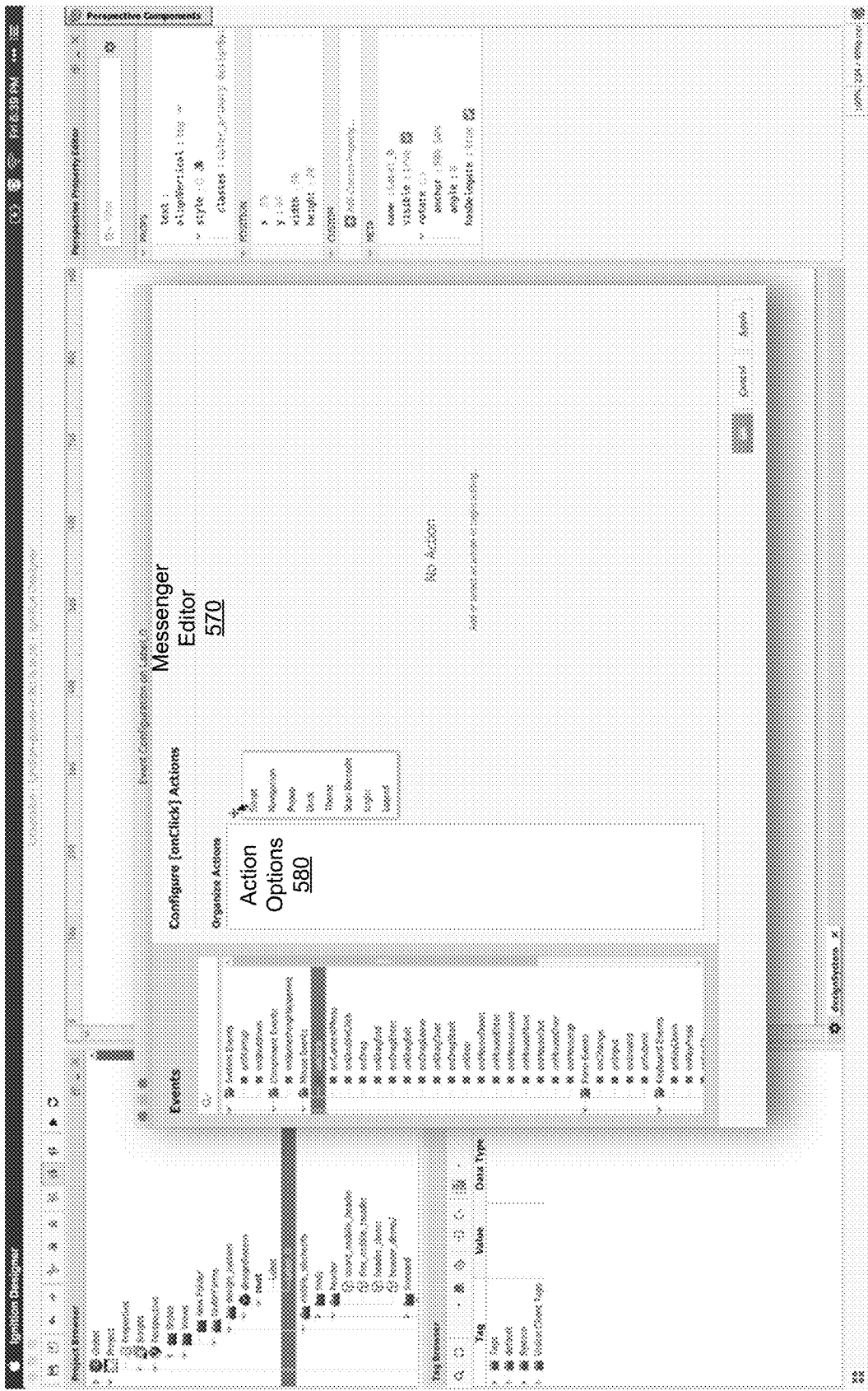
Figure 7C:
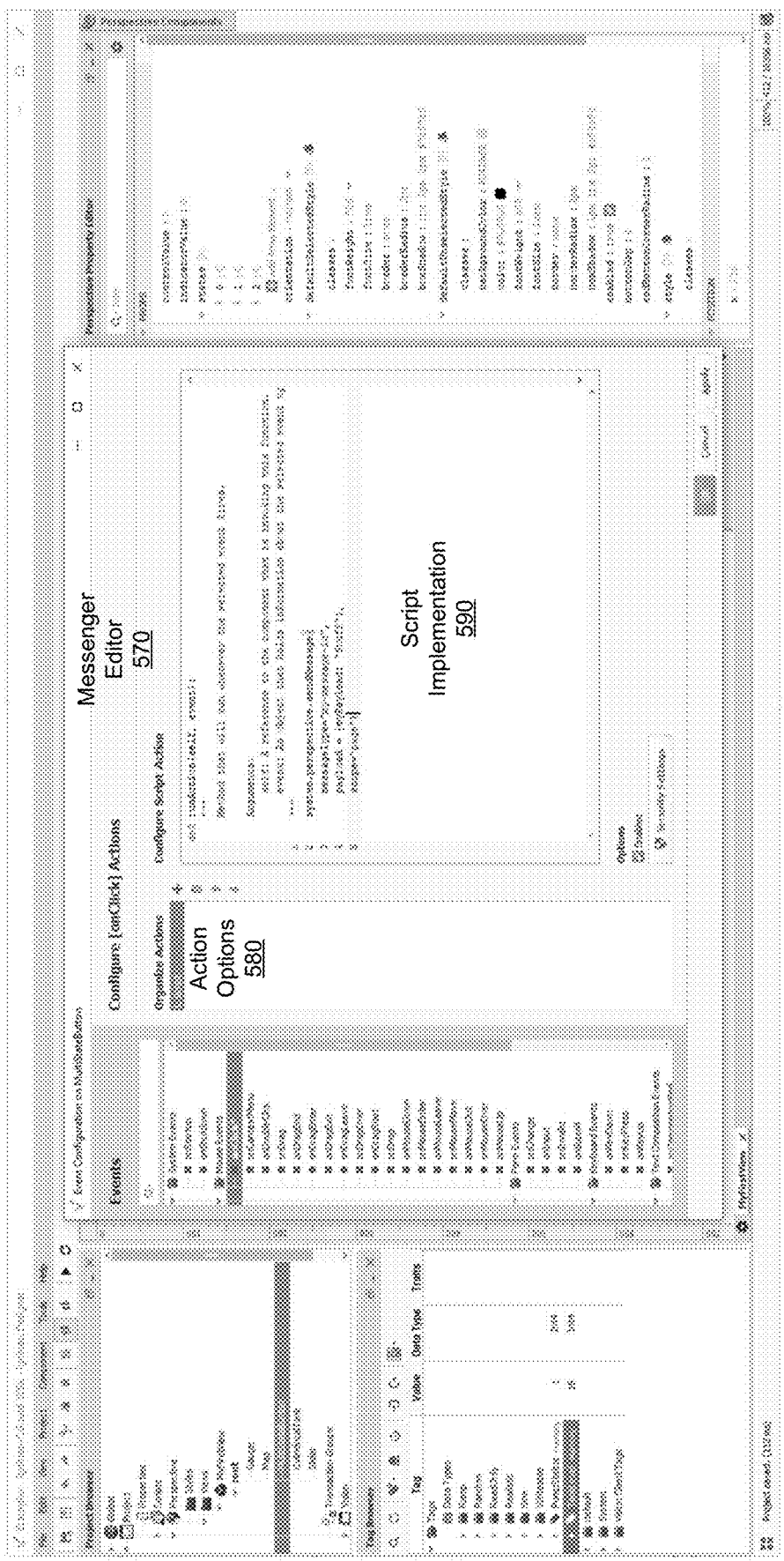

FIGS. 7A-7C are examples of the design GUI and its various graphical elements as described in FIG. 5B, in accordance with some embodiments.

FIG. 7A is an example screenshot of a design GUI 400, in accordance with an embodiment. The design GUI 400 has various graphical elements as described in FIG. 4, including the project browser 410, the component display panel 420, the web browser 425, the property editor panel 430, the source data browser 440, and the toolbar 450. In this screenshot, the web browser 425 already has a component 460 populated in a portion of the web browser. Having received a selection input selecting the component 460, a dropdown menu of a variety of actions is graphically displayed beside the component 460. A mouse pointer clicks on the action in the dropdown menu titled "Configure Events . . . ", which corresponds to selection for defining a messenger associated with the component 460.

FIG. 7B is an example screenshot of the messenger editor window 570, in accordance with an embodiment. This screenshot may be a continuation example of FIG. 7A. As seen in this screenshot, the messenger editor window 570 displays actions option 580 on a left portion of the window. The mouse pointer clicks on the action options 580 to configure a messenger associated with the component 460.

FIG. 7C is an example screenshot showing definition inputs of the messenger editor window 570, in accordance with an embodiment. This screenshot may be a continuation example of FIGS. 7A & 7B. As a continuation example of FIG. 7B, when one of the action options 580 is clicked on, the messenger editor window 570 displays definition inputs for defining the messenger associated with the component 460. In other embodiments, the definition inputs are displayed when the messenger editor window 570 is opened. The definition inputs include the script implementation 590 where the design client 115 may write a script for defining the messenger. In this screenshot, the script implementation 590 includes a message type argument as a string of "my-message-id", a scope argument of "page" level, and a payload argument including an object of "{myPayload: "Stuff"}".

Example Receipt of Message

Figure 8:
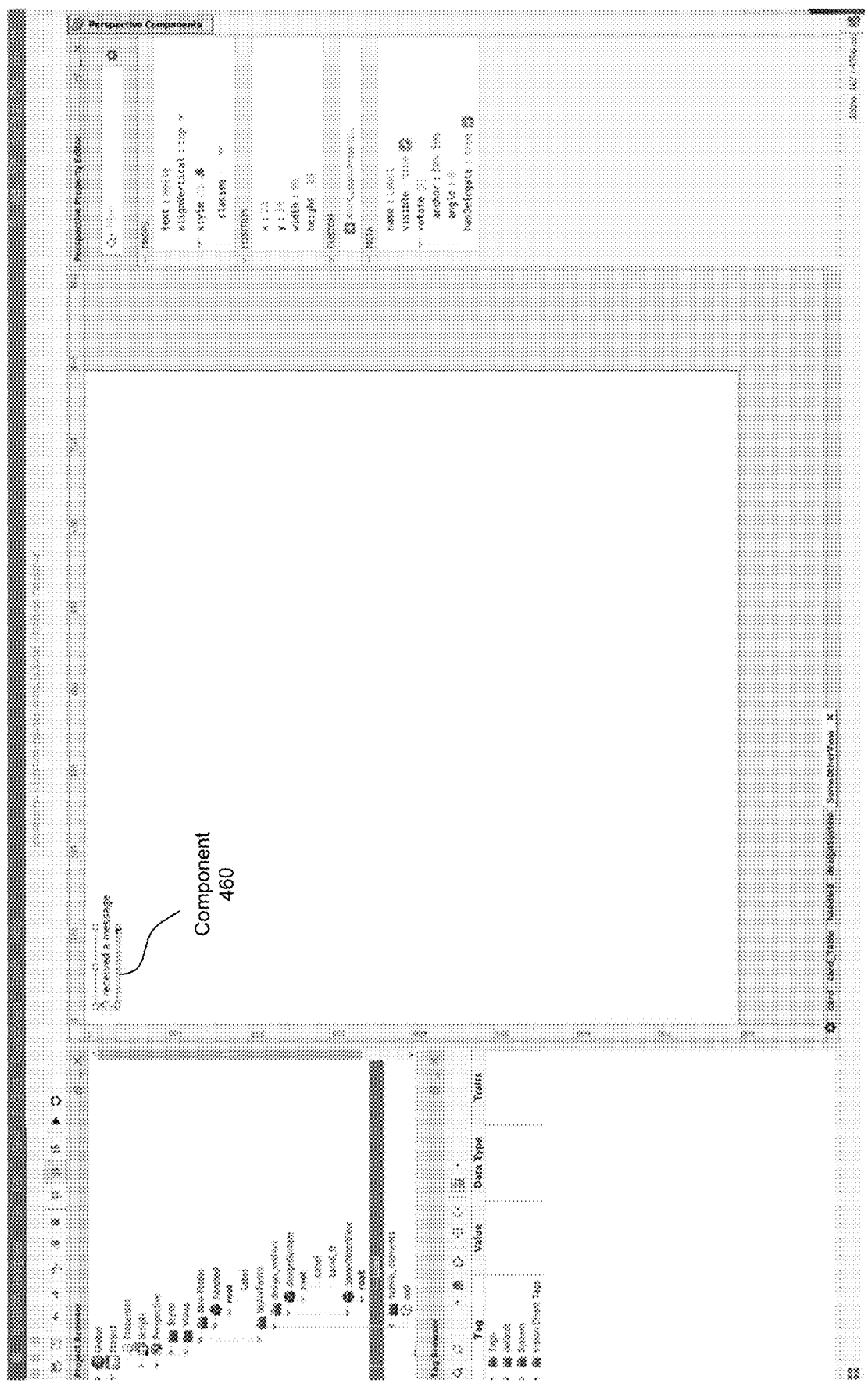
FIG. 8 is an example of the design GUI with a component receiving a message, in accordance with an embodiment.

FIG. 8 is a continuation example of the design GUI 400 with a component 460 receiving a message, in accordance with an embodiment. The component 460 in this continuation example of FIG. 6C has an associated message handler. The message handler as defined in FIG. 6C reacts to receiving messages by printing the string of "I received a message". In accordance with description in FIGS. 2 & 3, the gateway system 130 (e.g., specifically the event bus module 260) receives a message input to send a message via a messenger associated with a component. The message originating from the messenger includes a message type argument, a scope argument, and a payload argument. The gateway system 130 identifies appropriate message handlers to receive the message by identifying message handlers with a message type definition and a scope definition that matches the message's message type argument and the scope argument, respectively.

Method of Delivering Messages

Figure 9:
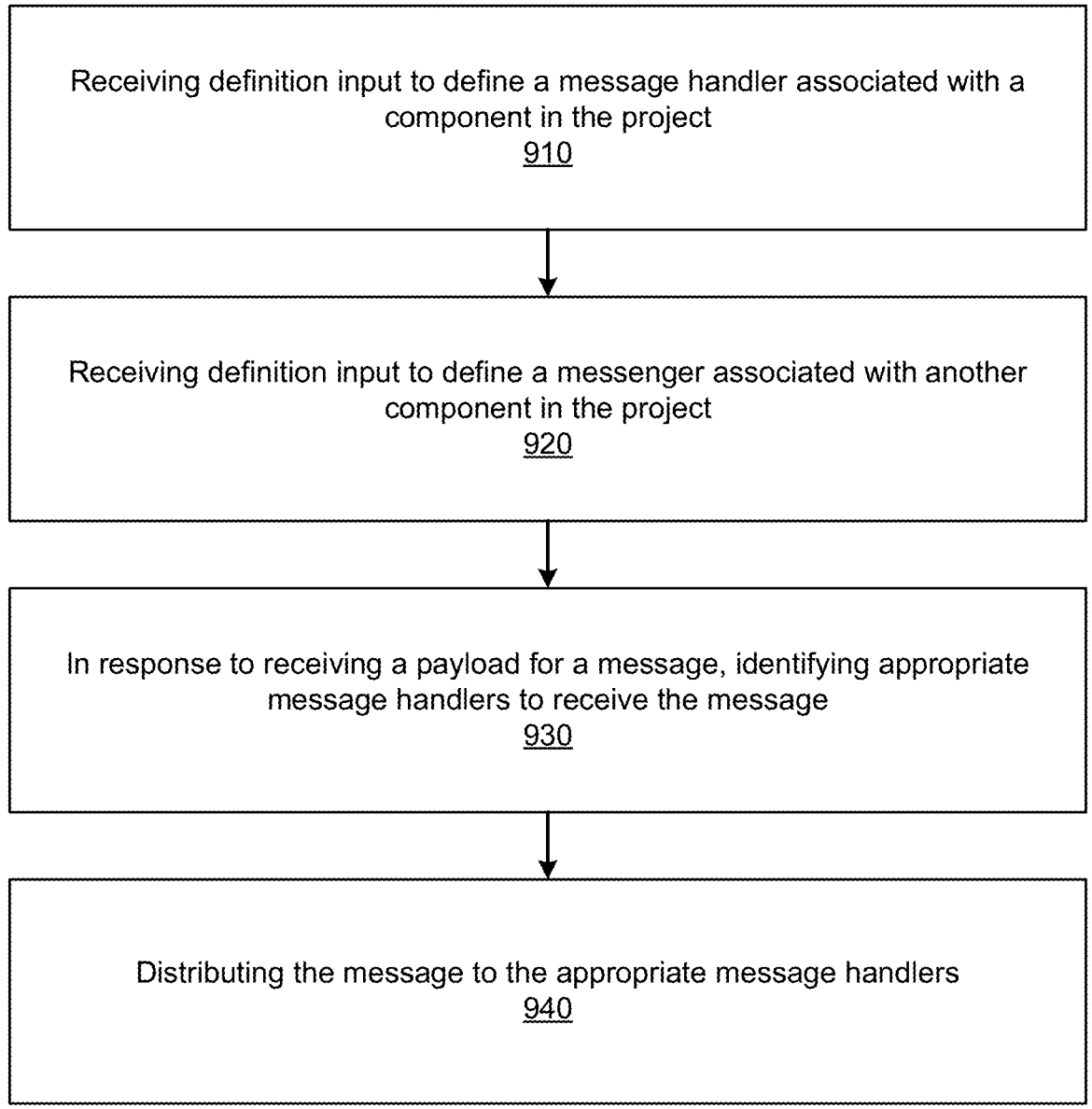
FIG. 9 is a flowchart illustrating a process of delivering a message, in accordance with some embodiments.

FIG. 9 is a flowchart illustrating a process 900 by the gateway system 130 for delivering messages in a project, in accordance with some embodiments. The process 900 may be accomplished by any combination of various modules of the gateway system 130, e.g., the event bus module 260, the design module 270, and/or the client interfacing module 280.

The process 900 includes receiving 910 a definition input to define a message handler associated with a component in the project. The definition input includes a scope definition, a message type definition, and a script implementation for the message handler, as described above in FIGS. 2 & 3. In response the receiving the definition input, the gateway system 130 may define a message handler associated with the component that reacts to messages defined by the script implementation, wherein the messages received have a scope argument and a message type argument that matches the message handler's scope definition and message type definition, respectively.

The process 900 includes receiving 920 definition input to define a messenger associated with another component in the project. The definition input for the messenger includes a script implementation for sending messages from the messenger. The script implementation includes a scope argument, a message type argument, and a payload option. In some embodiments, the payload option already includes the payload. In other embodiments, the payload option provides a manner through which a client 110 or 115 may provide a payload to send a message with the messenger. When a message originates from the defined messenger, the message includes the scope argument and the message type argument from the messenger.

The process 900 includes, in response to receiving a payload for a message, identifying 930 appropriate message handlers to receive the message. Through the payload option, the client 110 or 115 provides a payload input to send a message with a messenger. The gateway system 130 packages the message to include the scope argument and the message type argument from the originating messenger. In addition, the message includes the payload from any combination of the payload input received from the client 110 or 115 and/or the payload option in the messenger. The gateway system 130 identifies appropriate message handlers by matching the scope definition and the message type definition of message handlers to the scope argument and the message type argument of the message.

The process 900 includes distributing 940 the message to the appropriate message handlers. The gateway system 130 provides the payload to the appropriate message handlers. With each message handler, the gateway system 130 may further execute the responses to receiving the message including the payload.

CONCLUSION

Figure 10:
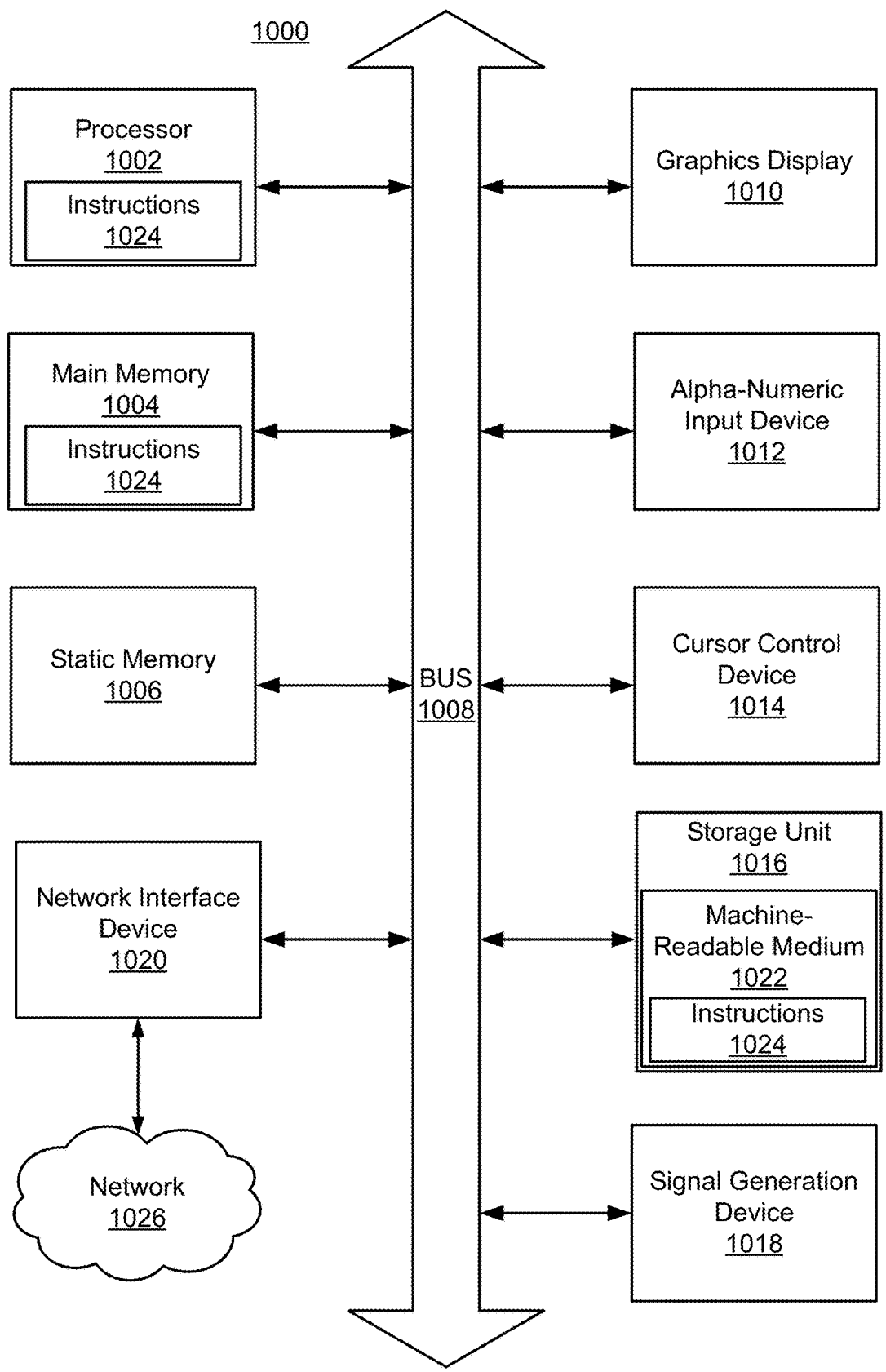
FIG. 10 is a block diagram illustrating components of an example machine able to read instructions from a machine-readable medium and execute the instructions in one or more processors, in accordance with some embodiments.

FIG. 10 is a block diagram illustrating components of an example machine able to read instructions from a machine-readable medium and execute them in one or more processors (or controllers). Specifically, FIG. 10 shows a diagrammatic representation of gateway system 130 in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1000 also includes a main memory 1004. The computer system may include a storage unit 1016. The processor 1002, memory 1004, and the storage unit 1016 communicate via a bus 1008.

In addition, the computer system 1000 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008. In some embodiments, the computer system 1000 may include cell phone or smartphone hardware, such as a camera, motion sensor, accelerometer, scanner (or QR code reader), global positioning system (GPS) functionalities and geolocation abilities, near field communication, etc.

The storage unit 1016 includes a machine-readable medium 1022 on which is stored instructions 1024 (e.g., software) embodying any one or more of the methodologies or functions described herein. For example, the instructions 1024 may include instructions for implementing the functionalities of the event bus module 260, the design module 270 and/or the client interfacing module 280. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
    in a project comprising components arranged in a hierarchical structure and displayed in a web browser, each component having one or more graphical features or one or more behavioral features of the component when displayed in the web browser:
    receiving first definition input to define a message handler associated with a first component in the project for receiving messages for the first component, the definition input comprising:
        a message type definition for the message handler identifying the message the message handler reads;
        a scope definition for the message handler indicating one or more levels in the hierarchical structure of the project at which the message handler receives messages;
        a script implementation describing a response by the message handler to receiving messages;
    receiving second definition input to define a messenger associated with a second component in the project for sending messages to one or more message handlers, the message input comprising:
        a message type argument;
        a scope argument indicating a level of the project at which to deliver the message; and
        a payload option; and
    wherein, in response to receiving a payload input via the messenger associated with the second component from a session of the project:
        identifying the first component having the associated message handler by matching the message type definition to the message type argument of the messenger and the scope definition to the scope argument of the messenger; and
        delivering the payload as an argument to the identified first component with the matching message handler; and
        executing the script implementation of the message handler associated with the first component.

2. The computer-implemented method of claim 1, wherein payload input includes an object containing zero or more data values.

3. The computer-implemented method of claim 2, wherein an event bus accomplishes the delivering of the payload to the identified first component with the matching message handler and executing the script implementation of the message handler.

4. The computer-implemented method of claim 1, further comprising:
    modifying any combination of graphical features and behavioral features of the first component associated with the identified message handler by executing the script implementation of the identified message handler for the first component.

5. The computer-implemented method of claim 1, further comprising:
    in response to receiving the first definition input, generating the message handler associated with the first component, the message handler configured to receive messages directed to a level of the project based on the scope definition and with a message type argument according to the message type definition.

6. The computer-implemented method of claim 1, further comprising:
    in response to receiving the second definition input, generating the messenger associated with the second component, the messenger configured to send messages directed to a level of the project based on the scope argument of the messenger and with a message type argument according to the message type argument of the messenger.

7. The computer-implemented method of claim 1, wherein the hierarchical structure of components comprises a session of the project considered at a first level, one or more pages considered at a second level, wherein each page comprises one or more views considered at a third level, and wherein each view comprises one or more components.

8. The computer-implemented method of claim 1, wherein the identified first component is identified from active components that are actively displayed in the session of the project.

9. The computer-implemented method of claim 1, further comprising:

wherein, in response to receiving the payload input, generating a message from the messenger, the message comprising:
- a scope argument based on the scope argument of the messenger associated with the second component,
- a message type argument based on the message type argument of the messenger, and
- the payload input.

10. A computer-readable non-transitory storage medium with encoded instructions that, when executed by a processor, cause the processor to accomplish steps of:

accessing a project comprising components arranged in a hierarchical structure and displayed in a web browser, each component having one or more graphical features or one or more behavioral features of the component when displayed in the web browser;

receiving first definition input to define a message handler associated with a first component in the project for receiving messages for the first component, the definition input comprising:
- a message type definition for the message handler identifying the message the message handler reads;
- a scope definition for the message handler indicating one or more levels in the hierarchical structure of the project at which the message handler receives messages;
- a script implementation describing a response by the message handler to receiving messages;

receiving second definition input to define a messenger associated with a second component in the project for sending messages to one or more message handlers, the message input comprising:
- a message type argument;
- a scope argument indicating a level of the project at which to deliver the message; and
- a payload option; and wherein, in response to receiving a payload input via the messenger associated with the second component from a session of the project:
- identifying the first component having the associated message handler by matching the message type definition to the message type argument of the messenger and the scope definition to the scope argument of the messenger; and
- delivering the payload as an argument to the identified first component with the matching message handler; and
- executing the script of the message handler associated with the first component.

11. The computer-readable non-transitory storage medium of claim 10, wherein payload input includes an object containing zero or more data values.

12. The computer-readable non-transitory storage medium of claim 11, wherein an event bus accomplishes the delivering of the payload to the identified first component with the matching message handler and executing the script implementation of the message handler.

13. The computer-readable non-transitory storage medium of claim 10, wherein the encoded instructions further cause the processor to accomplish an additional step of:
modifying any combination of graphical features and behavioral features of the first component associated with the identified message handler by executing the script implementation of the identified message handler for the first component.

14. The computer-readable non-transitory storage medium of claim 10, wherein the encoded instructions further cause the processor to accomplish an additional step of:
in response to receiving the first definition input, generating the message handler associated with the first component, the message handler configured to receive messages directed to a level of the project based on the scope definition and with a message type argument according to the message type definition.

15. The computer-readable non-transitory storage medium of claim 10, wherein the encoded instructions further cause the processor to accomplish an additional step of:
in response to receiving the second definition input, generating the messenger associated with the second component, the messenger configured to send messages directed to a level of the project based on the scope argument of the messenger and with a message type argument according to the message type argument of the messenger.

16. The computer-readable non-transitory storage medium of claim 10, wherein the hierarchical structure of components comprises a session of the project considered at a first level, one or more pages considered at a second level, wherein each page comprises one or more views considered at a third level, and wherein each view comprises one or more components.

17. The computer-readable non-transitory storage medium of claim 10, wherein the identified first component is identified from active components that are actively displayed in the session of the project.

18. The computer-readable non-transitory storage medium of claim 10, wherein the encoded instructions further cause the processor to accomplish an additional step of:
wherein, in response to receiving the payload input, generating a message from the messenger, the message comprising:
- a scope argument based on the scope argument of the messenger associated with the second component,
- a message type argument based on the message type argument of the messenger, and
- the payload input.

* * * * *